(12) United States Patent
Pikul et al.

(10) Patent No.: US 11,077,587 B2
(45) Date of Patent: Aug. 3, 2021

(54) STRETCHABLE SURFACES WITH PROGRAMMABLE TEXTURE

(71) Applicant: Cornell University, Ithaca, NY (US)

(72) Inventors: James Pikul, Ithaca, NY (US); Itai Cohen, Ithaca, NY (US); Robert Shepherd, Ithaca, NY (US)

(73) Assignee: Cornell University, Ithaca, NY (US)

( * ) Notice: Subject to any disclaimer, the term of this patent is extended or adjusted under 35 U.S.C. 154(b) by 107 days.

(21) Appl. No.: 16/161,029

(22) Filed: Oct. 15, 2018

(65) Prior Publication Data
US 2019/0126516 A1 May 2, 2019

Related U.S. Application Data

(60) Provisional application No. 62/572,282, filed on Oct. 13, 2017.

(51) Int. Cl.
| | |
|---|---|
| *B29C 41/52* | (2006.01) |
| *B29C 41/00* | (2006.01) |
| *B29C 41/22* | (2006.01) |
| *B29C 41/20* | (2006.01) |
| *B29C 41/12* | (2006.01) |
| *B29C 35/08* | (2006.01) |

(Continued)

(52) U.S. Cl.
CPC ............ *B29C 41/52* (2013.01); *B23K 26/40* (2013.01); *B29C 35/0805* (2013.01); *B29C 39/006* (2013.01); *B29C 39/10* (2013.01); *B29C 41/003* (2013.01); *B29C 41/12* (2013.01); *B29C 41/20* (2013.01); *B29C 41/22* (2013.01); *B29C 2035/0838* (2013.01); *B29K 2083/00* (2013.01); *B29K 2105/206* (2013.01); *B29L 2031/702* (2013.01)

(58) Field of Classification Search
CPC ....... B29C 41/52; B29C 41/003; B29C 41/22; B29C 35/0805; B29C 2035/0838; B29K 2083/00
See application file for complete search history.

(56) References Cited

U.S. PATENT DOCUMENTS

| | | | |
|---|---|---|---|
| 9,305,124 B2 * | 4/2016 | Han | G06F 30/367 |
| 2016/0104320 A1 * | 4/2016 | Ward | G06T 17/05 |
| | | | 345/423 |

* cited by examiner

*Primary Examiner* — Michael P Wieczorek
(74) *Attorney, Agent, or Firm* — Hodgson Russ LLP

(57) ABSTRACT

The present disclosure may be embodied as a method for creating a restriction pattern from a mask material having a strain ($\varepsilon_{mask}$) an for mapping elastomeric membrane having a strain ($\varepsilon_{membrane}$) into a target 3D shape. The method may include discretizing the target 3D shape into a plurality of radial segments, and a radial strain ($\varepsilon_r$) is determined for each radial position (r) on each radial segment of the plurality of radial segments. A restriction pattern is determined, wherein the restriction pattern comprises a quantity of mask material for each position r to provide a composite strain ($\varepsilon_{mask}$, $\varepsilon_{silicone}$). In some embodiments, the method further includes depositing a first membrane layer into a mold and placing mask material into the first membrane layer according to the determined restriction pattern. The first membrane layer is cured.

10 Claims, 20 Drawing Sheets

(51) Int. Cl.
B29C 39/00 (2006.01)
B29C 39/10 (2006.01)
B23K 26/40 (2014.01)
B29K 83/00 (2006.01)
B29K 105/20 (2006.01)
B29L 31/00 (2006.01)

A  Camouflaged asymmetric and hierarchical stones
B  *Graptoveria amethorum* with suspended supports Inflated surface Top view Side Deflated surface Mesh design C *Graptoveria amethorum* plant D Gaussian curvature

| | Stone | Aloe |
|---|---|---|
| Inflated |  |  |
| Deflated |  |  |

−0.03 cm$^{-2}$       0.0       0.03

E

STRETCHABLE SURFACES WITH PROGRAMMABLE TEXTURE

CROSS-REFERENCE TO RELATED APPLICATIONS

This application claims priority to U.S. Provisional Application No. 62/572,282, filed on Oct. 13, 2017, the disclosure of which is incorporated herein by reference.

STATEMENT REGARDING FEDERALLY SPONSORED RESEARCH

This invention was made with government support under contract no. W911NF-16-1-0006 awarded by the Army Research Office. The government has certain rights in the invention.

FIELD OF THE DISCLOSURE

The disclosure generally relates to soft materials. More particularly, the disclosure relates to morphing surfaces.

BACKGROUND OF THE DISCLOSURE

Technologies using soft, stretchable materials are becoming increasingly important, yet it remains difficult to control how these materials stretch with much more sophistication than inflating party balloons. Achieving non-symmetric hierarchical surfaces is challenging because it is necessary to design and control the transformation of, for example, 2D planar surfaces into complex 3D non-Euclidean shapes. While there are several candidate technologies that enable the control of soft material surfaces (hydrogels, shape-memory polymers, and liquid crystal elastomers, among others), pneumatic actuation of stretchable elastomers is particularly appealing due to fast actuation rates (frequency, f~4 Hz), the ability to be cycled millions of times, high energy density (~80 $Jg^{-1}$ for compressed air), and scalable manufacturing over millimeter to meter length scales. Designing the shape of inflated elastomeric surfaces, however, has been a challenge because of their non-linear mechanics, large number of configurations that a surface can deform to, and lack of computationally efficient models that can predict the final shape.

BRIEF SUMMARY OF THE DISCLOSURE

To overcome the design challenge of creating a mapping for reversibly transforming a stretchable 2D plane into a 3D surface, an analogy of artificial muscle groupings are used to develop a one-to-one mapping for reversibly transforming synthetic skins into complex hierarchical shapes.

The present disclosure provides synthetic tissue groupings that allowed programmable transformation of 2D stretchable surfaces into target 3D shapes. The synthetic tissue groupings comprise stretchable elastomeric membranes embedded with inextensible mesh that inflated to within 10% of their target shapes using a simple fabrication method and modeling approach. These stretchable surfaces transform from flat sheets to programmed 3D textures that mimic natural stone and plant shapes and camouflage into their background environments.

A method is presented for reversibly transforming 2D surfaces into complex hierarchical 3D shapes. The presently-disclosed method was demonstrated with pneumatically actuated composites of mesh embedded elastomers.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

In an exemplary embodiment of this disclosure, two materials are used to act as synthetic tissue groupings—a silicone elastomer and a fiber mesh embedded in the silicone elastomer. The fiber mesh acts as local connective tissue fiber reinforcement that provides a force towards the synthetic papilla's central axis and controls the 3D shape, while the elastomer acts as stretchable connected tissue that stretches (in tension) normal to the synthetic skin surface. Although demonstrated here with pneumatically actuated elastomers, the present disclosure can be implemented with any pair of materials that have different stretching responses (e.g., swelling hydrogels, dielectric elastomer actuators, shape-memory polymers, liquid crystal elastomers, etc.) This binary system is used herein to solve the design challenge of mapping a 2D surface into a 3D shape. Similar to an inflated balloon, the silicone is pneumatically actuated to cause it to stretch both radially and circumferentially. A mesh material embedded into the elastomer allows the shape of the actuated material to be altered. For example, the embedded mesh restricts local stretching and prescribes the actuated (e.g., inflated) shape. The embedded mesh is patterned to provide a desired actuated shape. For example, an inextensible yet flexible mesh can be embedded in concentric rings to constrain circumferential stretching of the elastomer to near zero. This constraint allows a one-to-one mapping from the radial stretch of the elastomer to a target 3D shape displacement—a mechanism termed Circumferentially COnstrained and Radially Stretched Elastomer (CCOARSE). For example, the resulting shapes can be dynamically inflated to any state between flat and fully erect at frequencies up to 1 Hz or higher. The utility of this technique was demonstrated by designing inflatable, non-symmetric hierarchical surfaces that camouflage into the textural context of their background environments.

Figure 1:
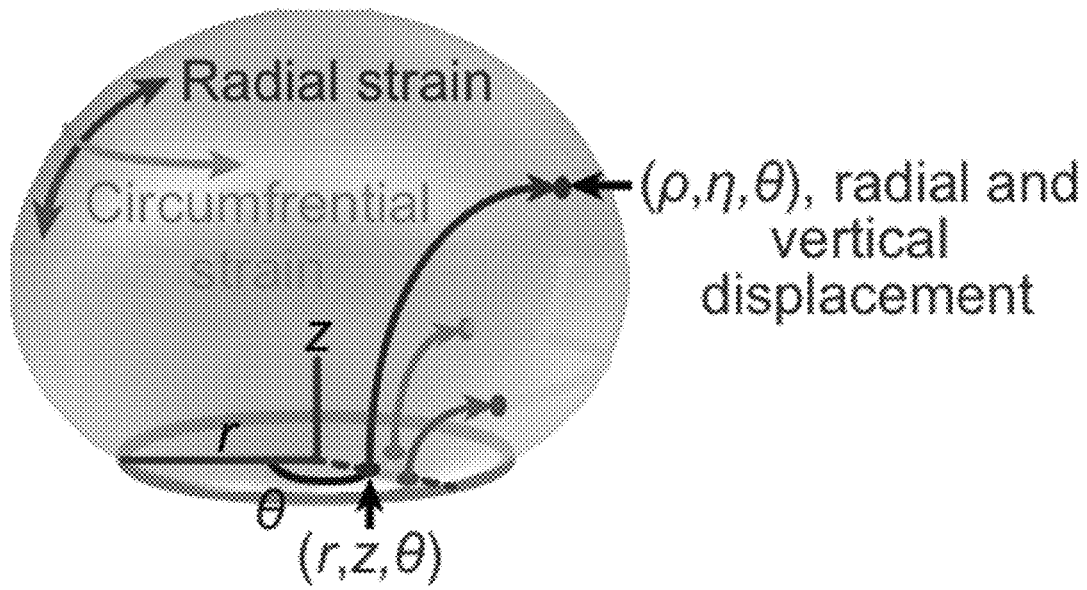
FIG. 1: An inflated silicone membrane showing the principal strains and resulting deformation of points on the undeformed planar membrane. The radial and circumferential strains displace the points vertically and radially, but not along theta.

The CCOARSE mechanism allows for the easy design of complex shapes by relating the radial and circumferential strain distribution in an elastomeric membrane to the target 3D shape (FIG. 1). These strains are denoted by $\varepsilon_r$ and $\varepsilon_c$, and are defined as:

$$\varepsilon_r = \left( \frac{\frac{d\rho^2}{dr} + \frac{d\eta^2}{dr}}{1 + \frac{dz^2}{dr}} \right)^{\frac{1}{2}} - 1 \quad (1)$$

$$\varepsilon_c = \frac{\rho}{r} - 1 \quad (2)$$

where the coordinate (r,z) is a point on the undeformed axisymmetric membrane defined in cylindrical coordinates and (ρ,η) is the location of the same point after the sheet is deformed. FIG. 1 illustrates this formulation through the displacement of three points on a silicone (hyperelastic) membrane clamped to a rigid ring with inner radius a=37.5 mm and loaded with a uniform pressure. To simplify the design challenge of constructing a strain field given a desired final shape, the undeformed membrane is set to a plane sheet (z(r)=0) and the deformation is constrained so there is no circumferential strain (ρ=r), then:

$$\varepsilon_r = \left(1 + \frac{d\eta^2}{dr}\right)^{\frac{1}{2}} - 1 \quad (3)$$

and $\varepsilon_c$=0. Under these constraints, the radial strain is directly related to the slope of the membrane in the radial direction (dη/dr). Importantly, because the CCOARSE mechanism is derived from the definition of strain, and does not require material properties, it is material independent and therefore broadly applicable when the materials used are able to achieve the required strain.

Figure 2:
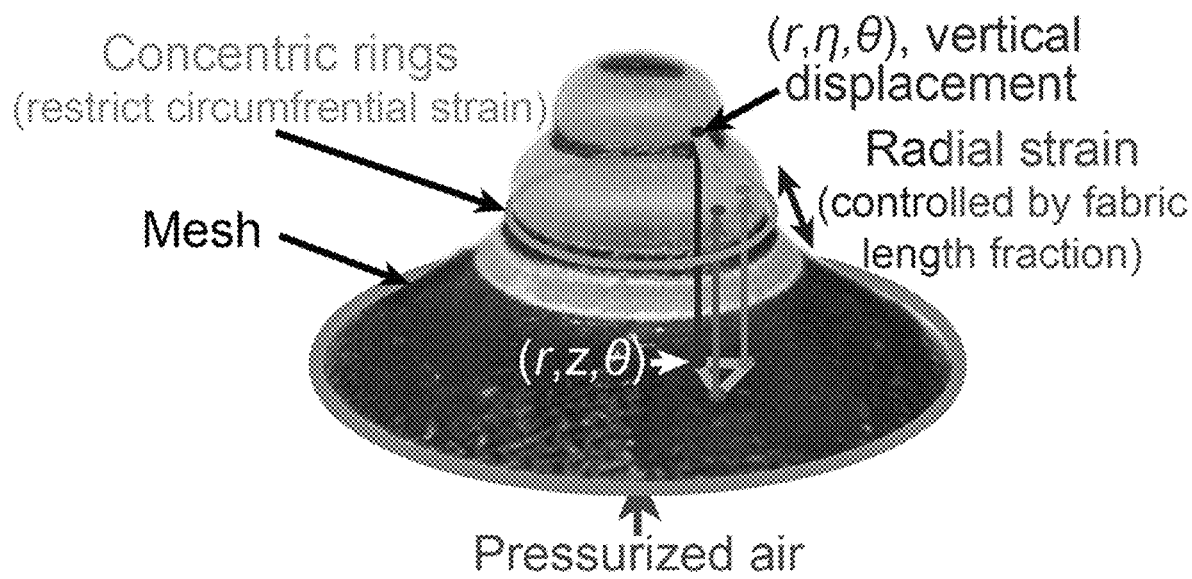
FIG. 2: An inextensible nonwoven mesh embedded in the silicone membrane constrains the circumferential strain, resulting in vertical displacement based on the radial strain.

The CCOARSE mechanism was demonstrated in exemplary pneumatically actuated membranes composed of low elastic modulus, E~38 kPa at ε=1, silicone (Ecoflex 00-30; Smooth-On, Inc.) embedded with concentric rings of high elastic modulus, E~7.7 MPa, nonwoven mesh (Soft'n Sheer Stabilizer, Sulky) that resists stretching. The concentric mesh rings prevented circumferential strain and restricted the elastomeric membrane to vertical displacement. FIG. 2 shows an example of a silicone-mesh composite membrane pressurized with air (ΔP=20 kPa), demonstrating high strain in the elastomeric regions and near zero strain in the mesh patterned areas.

In exemplary devices according to the present disclosure, the spacing between parallel mesh lines determined the local strain in the radial direction and produced an effective, continuous slope much like hatching produces tone or shading in a drawing. By using pneumatic actuation, the texture morphing can be rapidly cycled (f~1 Hz) using a one-to-one mapping from a 2D sheet design to a 3D target shape. The use of tough and resilient elastomers in the test embodiments allowed for the reversible deformation over hundreds of cycles. The out-of-plane compliance, isotropic mechanical properties, strength, and porosity of the nonwoven mesh provided a strong physical bond with the silicone and, despite the large discrepancy in elastic moduli between elastomer and mesh, resulted in smooth shapes with homogenous strain.

Figure 3:
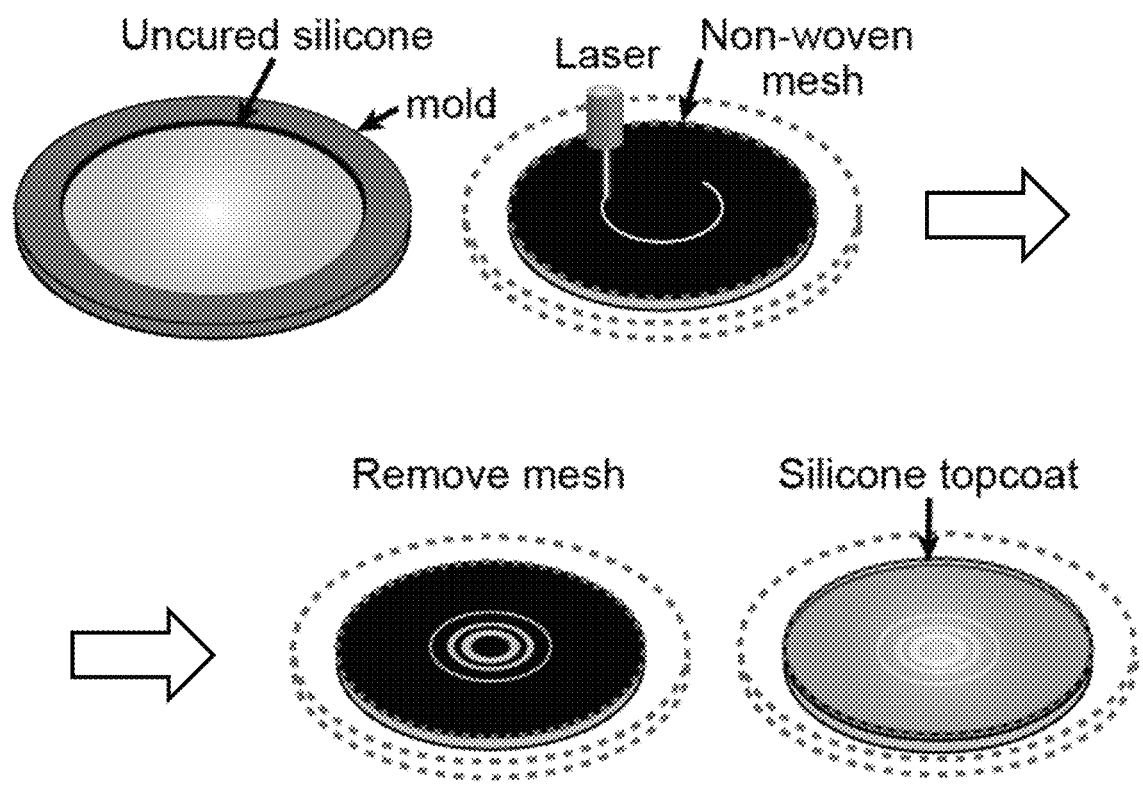
FIG. 3: Fabrication of an exemplary mesh-silicone membrane. Silicone is poured into a mold. Mesh is embedded, laser cut, removed, and then the silicone is cured. A topcoat of silicone may be added to fill voids and improve mesh adhesion.

An exemplary fabrication method (FIG. 3) for the test embodiments comprised pouring silicone into a 3D-printed mold to set the membrane shape and thickness. Nonwoven mesh was then placed into the uncured silicone according to a mesh pattern. For example, the mesh material may be treated to provide the mesh pattern. In a particular embodiment used for the test embodiments, the mesh was treated using a laser cutter (Zing 24, Epilog), and the excess mesh material was removed. Laser cutting allowed scalable fabrication with 200 μm feature resolution over square meter areas. The silicone was allowed to cure at room temperature. An additional layer of silicone was deposited onto the membrane. Embodiments of the present disclosure need not have additional layers.

Figure 4:
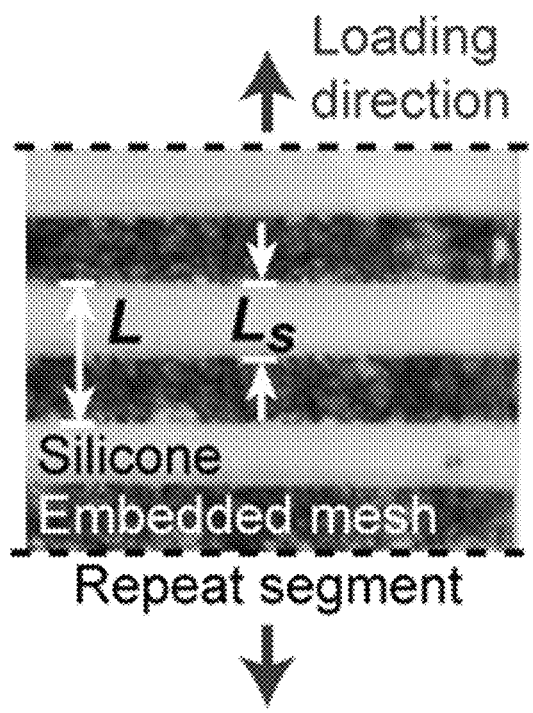
FIG. 4: A tensile testing specimen section with horizontal layers of mesh and $L_s/L$ silicone length fraction.
Figure 5:
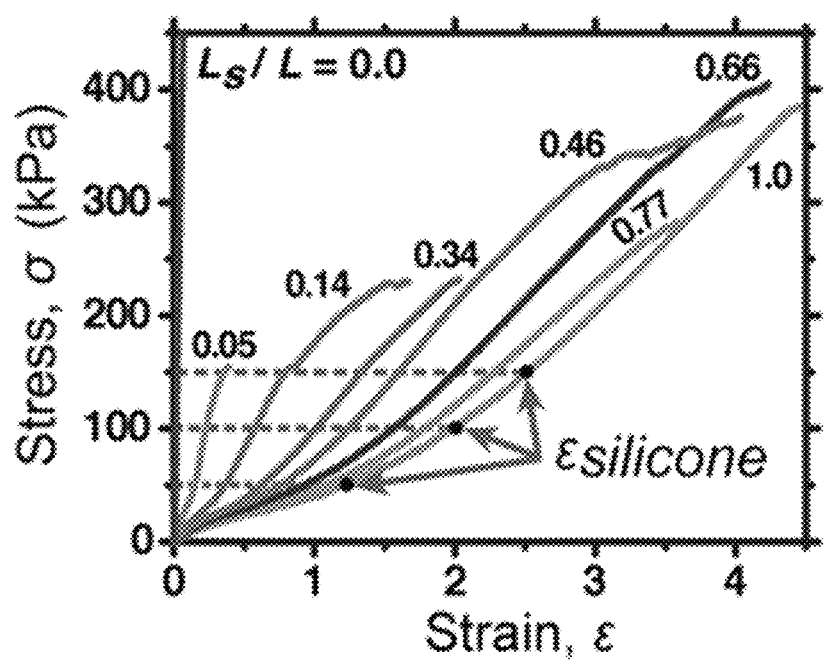
FIG. 5: Stress-strain measurements for specimens with multiple silicone length fractions. Samples failed at the mesh-silicone interface due to the increase in defect sites and increased silicone porosity.

To measure the effect of patterning extensible silicone with inextensible mesh, tensile mechanical testing (z010, Zwick/Roell) of 7- by 2-cm samples made from silicone embedded with horizontal mesh strips was performed. FIG. 4 shows a sample segment loaded in the vertical direction. $L_s$/L (where $L_s$ is the silicone length and L is the segment length) is used to denote the fraction of silicone not covered by mesh, with $L_s$/L=0 denoting all mesh and $L_s$/L=1 denoting no mesh. As the silicone length fraction increased from 0 to 1, the maximum elongation and yield stress increased (FIG. 5). Composite samples typically failed at the mesh-silicone interface due to the increase in defect sites and increased silicone porosity.

Figure 6:
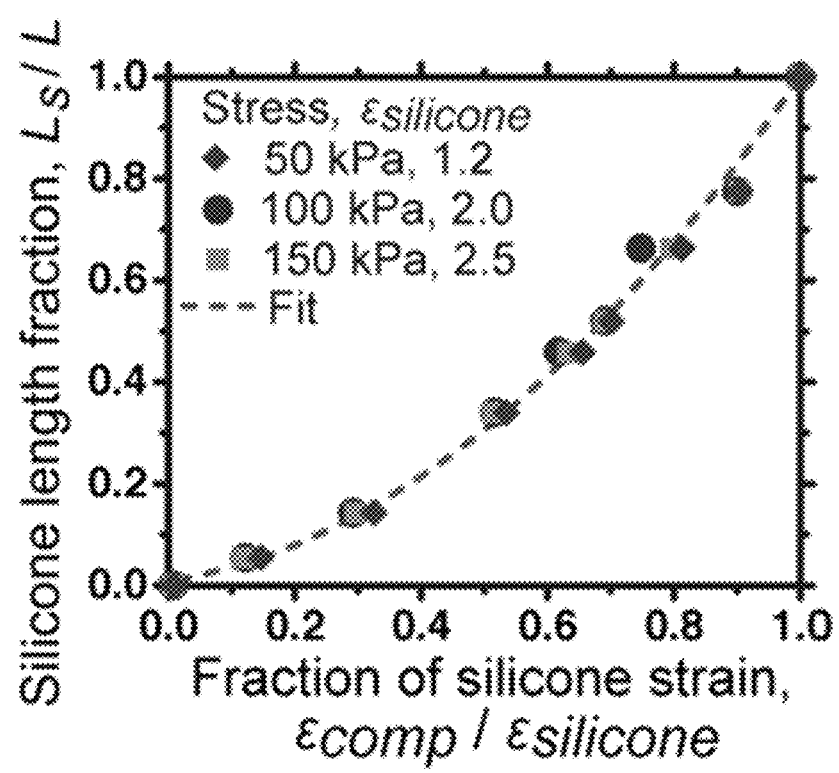
FIG. 6: Relationship between the composite membrane strain and silicone length fraction taken from FIG. 5 at 50, 100, and 150 kPa membrane stress states. This information maps the mesh design in a silicone-mesh composite membrane to a target 3D shape.

To map a target 3D shape using a composite mesh, a relationship was determined between mesh coverage, $L_s$/L, and the silicone-mesh composite strain relative to pure silicone, $\varepsilon_{comp}/\varepsilon_{silicone}$, at σ=50, 100, and 150 kPa (FIG. 6). A single curve, y=0.77$x^2$+0.23x, provided a direct mapping from a target strain to a silicone length fraction on an undeformed membrane. Using Eq. 3, a script was written that traced the outline of a 3D object and calculated the radial strain distribution at each radial coordinate. Using the curve fit in FIG. 6, this radial strain was converted to 2D silicone length fractions, $L_s$/L, that guided the inflated membrane to a target shape.

Figure 7:
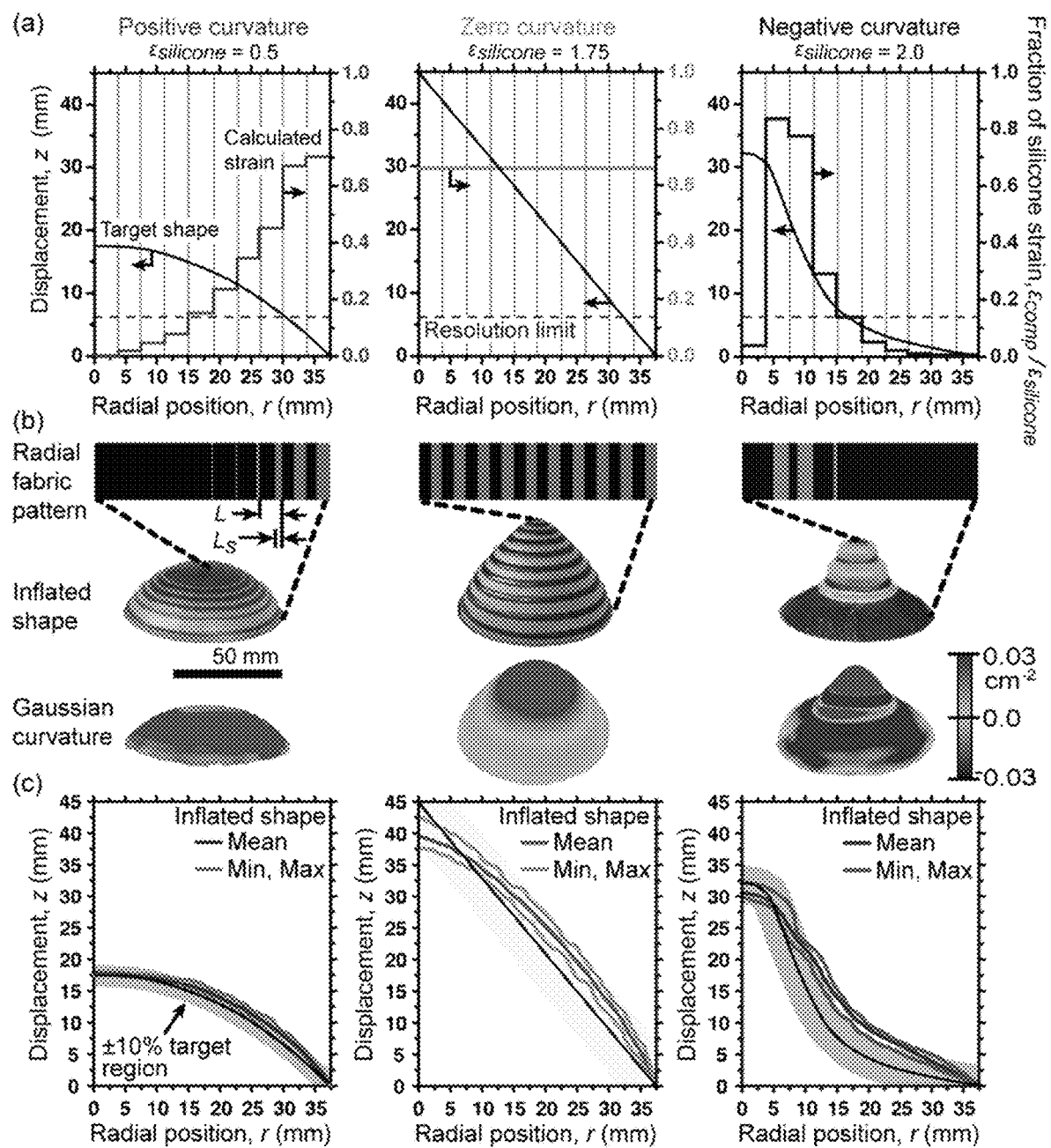
FIG. 7. Design and displacement of axisymmetric membranes with positive, zero, and negative Gaussian curvature target shapes. (A) The target shape displacement and composite radial strain versus radial position required to achieve that shape, discretized into 10 segments. (B) The radial mesh patterns mapped from the composite radial strain. Black represents mesh and gray is silicone. L is the length between vertical gray lines in (A). The resulting inflated shapes and Gaussian curvatures are shown below the mesh patterns. (C) The axisymmetric side profile of the inflated membranes. The plotted lines are the mean, minimum, and maximum displacement of 8 samples tested for each curvature. The highlighted regions behind the target shapes are displacements within 10% of the target shape (solid line).

The accuracy of CCOARSE was demonstrated by programing axisymmetric membranes that inflated into 3D positive, zero, and negative Gaussian curvature shapes (FIG. 7). For each target curvature, the radial position, r, was discretized into 10 segments to approximate the shape, and $\varepsilon_{comp}/\varepsilon_{silicone}$ versus r was calculated for each segment (FIG. 7A). Note that the number of radial segments is not an inherent limitation of CCOARSE, but indicative of the ~200 μm laser cutter resolution used in the experiments. The radial mesh patterns embedded into the silicone membranes were mapped from each $\varepsilon_{comp}/\varepsilon_{silicone}$ segment and are shown in FIG. 7B. The mean, minimum, and maximum displacements of eight membranes tested for each Gaussian curvature shape are shown in FIG. 7C. Reducing the input pressure allowed dynamic access to a continuum of shapes between flat and the fully erect target shape (dashed curves FIG. 7C). It was found that even with only ten segments, the CCOARSE approximations were remarkably effective, and the inflated shapes and measured Gaussian curvatures show only small aberrations on the order of 10% of the target height.

CCOARSE was used to reconstruct natural shapes with non-symmetric displacements and large variations in slope. This concept was demonstrated on a circular membrane with a single r-z cross-section programmed to a non-symmetric target displacement defined by a random nature stone sample (dashed curve FIG. 8A). To achieve the non-symmetric displacement, the membrane was embedded with an axially asymmetric mesh pattern. Large silicone length fractions were used on the edges and a nearly continuous mesh was used near the membrane center to achieve the large variation in angles, 0° to 60°, required for slopes between 0<dη/dr<2. The resulting inflated membrane had good shape fidelity in the high-sloped regions, and slight deviations in the shallow sloped region where the laser cutter limited the pattern resolution.

In another example, the hierarchical shapes of cephalopod papillae were mimicked using an inflatable silicone membrane patterned with hierarchical mesh patterns (FIG. 8B). Hierarchical membranes allowed for locally concave 3D shapes, which are otherwise difficult to achieve pneumatically because the positive air pressure energetically prefers the convex conjugate shape. An nth order mesh pattern in a hierarchical mesh pattern will inflate to a protruding shape on the (n-1)-order parent. In the synthetic papillae shown in FIG. 8B, the first-order shape is a negative Gaussian curvature surface and the second-order shapes are positive and zero Gaussian curvature surfaces. To achieve these complex architectures, the second-order mesh designs were overlaid onto the first-order mesh. A boundary mesh was included around the second-order mesh patterns when the second-order mesh design overlapped bare silicone in the first-order structure. To reduce the distortion on the first order structure caused by the boundary mesh, serpentine segments that expanded upon inflation were included. Including higher order structures in this manner rotated the upper most region of the first order structure by less than 7 degrees.

An additional challenge occurred when the 2D membrane shape and mesh patterns were noncircular. Under the uniform loading of pneumatic inflation, the low bending modulus of a mesh mat causes a noncircular mesh strip to curve into a more circular shape. To prevent the mesh strips from bending, horizontal mesh supports were adhered (Sil-Poxy, Smooth-On) to the underlying laser cut patterns (FIG. 8C). The mesh supports were porous to allow airflow and, when the membrane was inflated, prevented the embedded mesh patterns from bending. FIG. 8C shows two inflated membranes with identical, elliptical mesh patterns. The left pattern, without mesh supports, bent until the minor axis width increased from 16 to 23 mm; however, the right pattern with suspended mesh supports inflated to the desired shape profile. Collectively, the ability to create axisymmetric, non-symmetric, and hierarchically complex morphologies demonstrates the versatility of the presently-disclosed technique.

Figure 9:
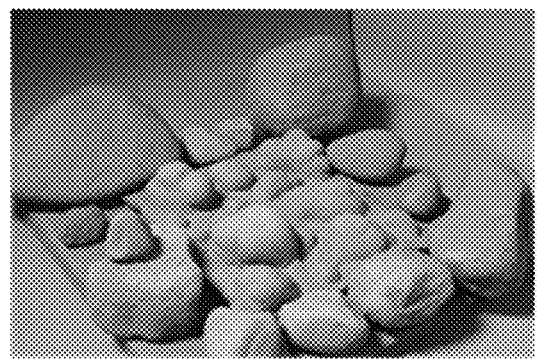
FIG. 9. Membranes programmed to deform into biomimetic shapes by combining axisymmetric, non-symmetric, and hierarchical shape transformations. (A) A 22- by 22-cm membrane programmed to inflate into non-symmetric and hierarchical stone shapes. Natural river stones with the same color encircle the membrane. The mesh design is shown on the bottom. (B) A membrane programmed to inflate into the shape of a *Graptoveria amethorum* plant. The leaves are arranged in a spiral around a center point and utilize suspended mesh supports to maintain the high aspect ratio mesh patterns. (C) Digital photograph of a *Graptoveria amethorum* plant. (D) The Gaussian curvatures of the inflated and deflated membranes. (E) A topographical map with stretchable electroluminescent display that inflated to the landscape's true 3D shape by the use of CCOARSE. The black contour lines and shaded regions represent areas of equal elevation.
Figure 9:
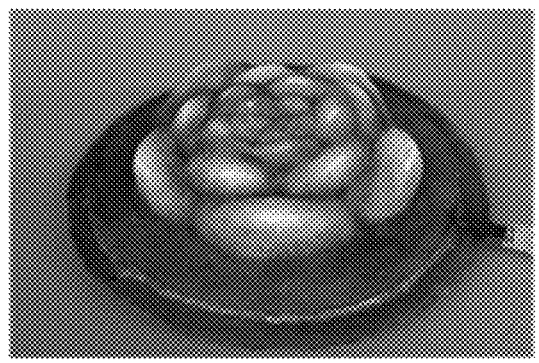
Figure 9:
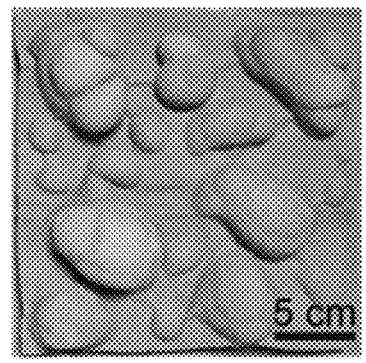
Figure 9:
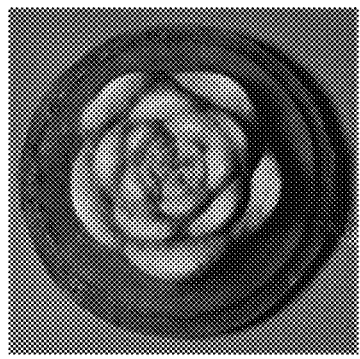
Figure 9:
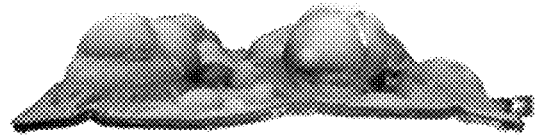
Figure 9:
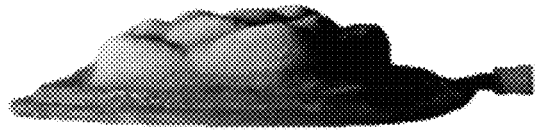
Figure 9:
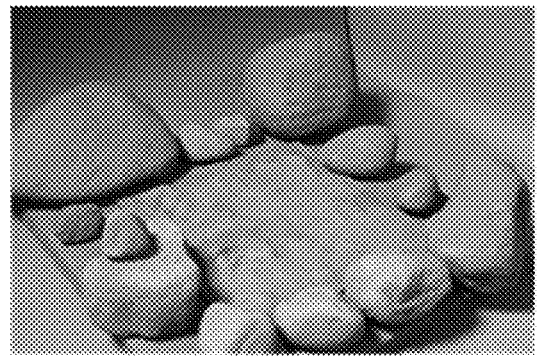
Figure 9:
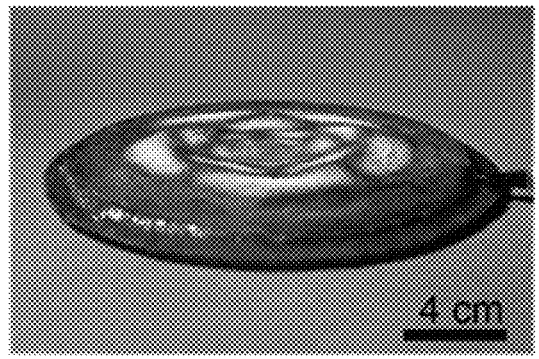
Figure 9:
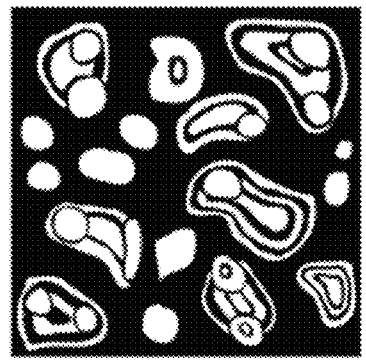
Figure 9:
Figure 9:
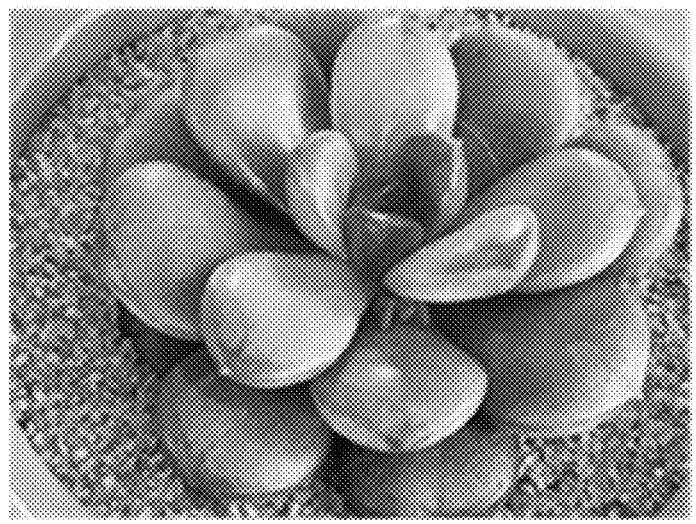
Figure 9:
Figure 9:
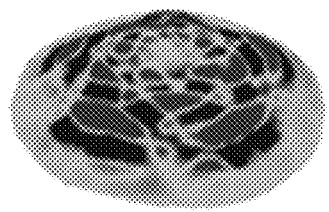
Figure 9:
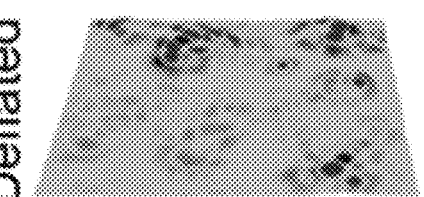
Figure 9:
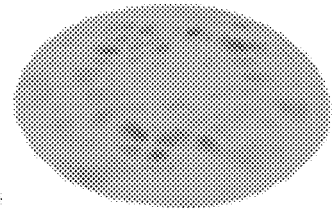
Figure 9:
Figure 9:
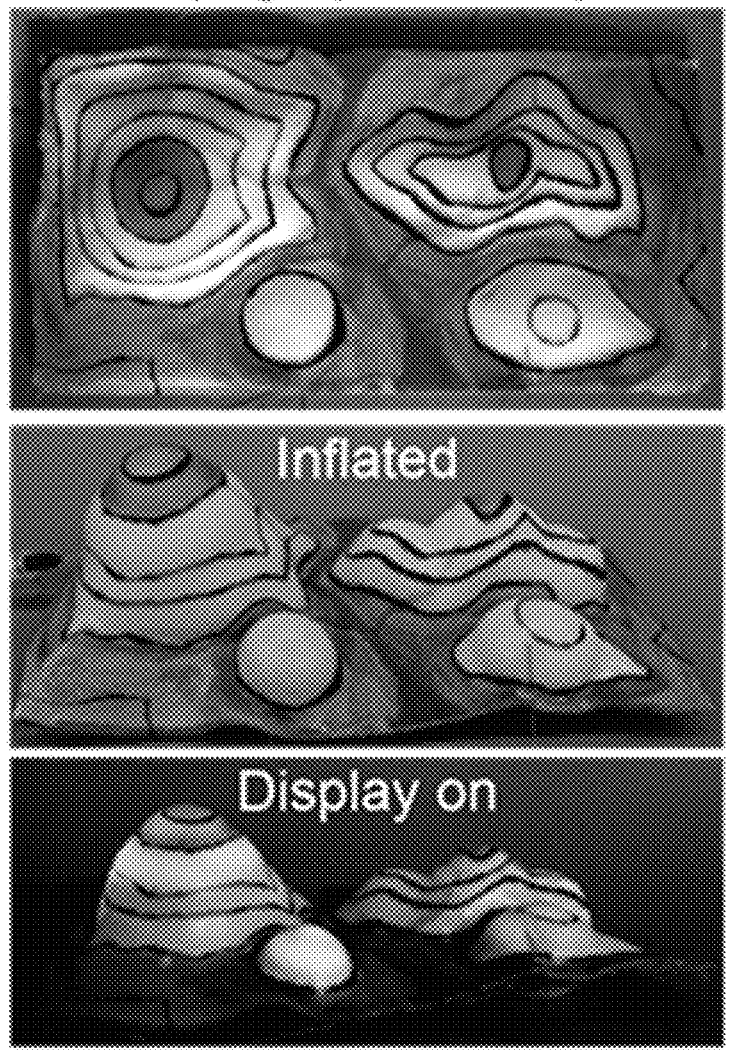
Figure 10:
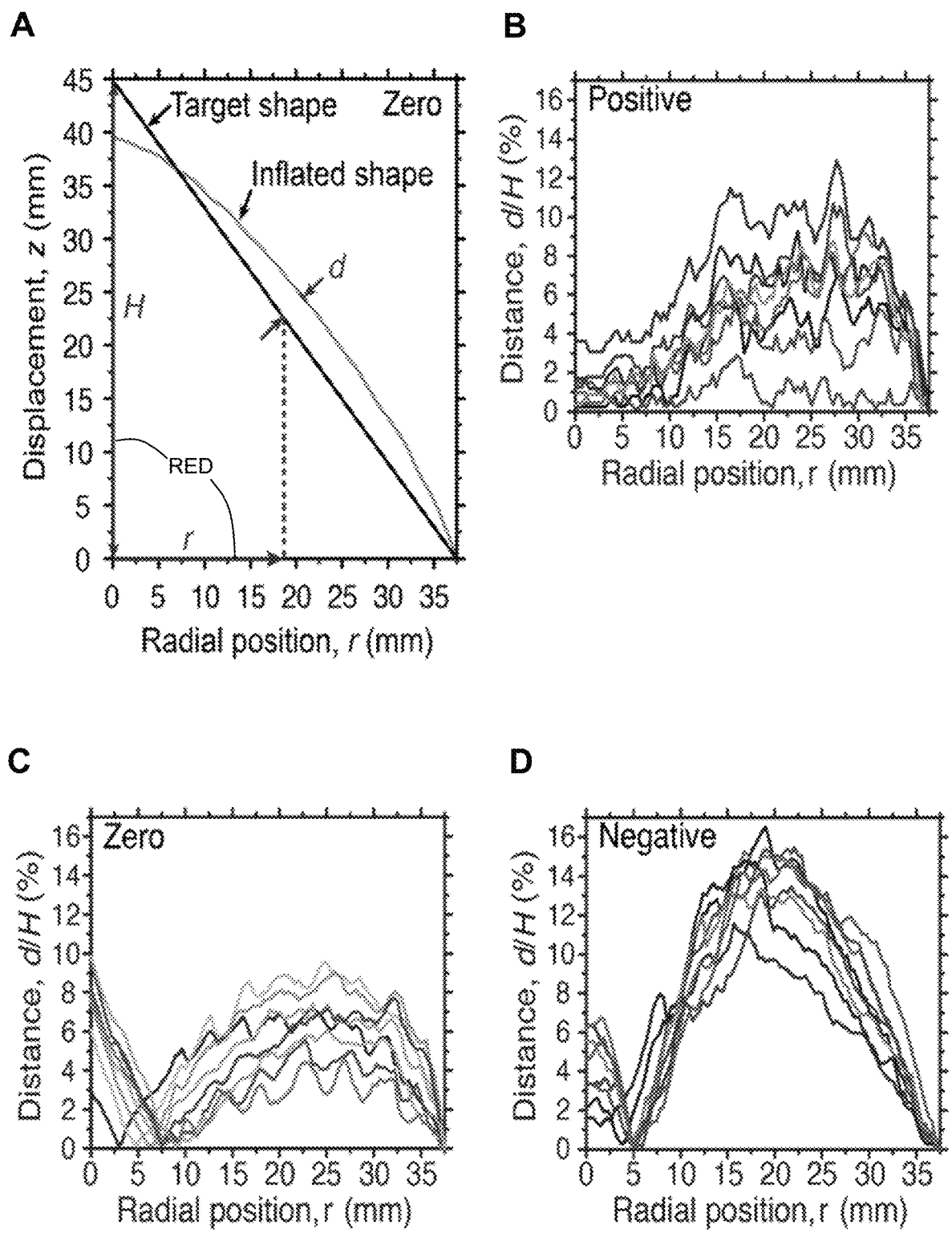
FIG. 10. Distances between inflated membranes and their target shape. (A) The displacement of a zero Gaussian curvature membrane and target shape. The distance between the membrane and target shape, d, at a radius, r, is shown in red. Distances between (B) positive, (C) zero, and (D) negative Gaussian curvature membrane displacements and their target shape profile, d/H. The target shape maximum displacements, H, are 17, 45, and 32 mm for the positive, zero, and negative Gaussian curvature surface.

By combining these morphologies, synthetic skins were developed that mimic natural shapes and camouflage into their background environments. FIG. 9A shows an inflated membrane programmed to deform into non-symmetric and hierarchical stone shapes. The membrane was surrounded by natural river stones to demonstrate the visual blending of the membrane into its rocky environment. Both the artificial and natural stones were painted a warm gray to control for differences in coloration. The artificial stone shapes combined simple and compound papillae characteristics found in cephalopod camouflage motifs. To replicate this complexity, each stone was programmed with up to four axisymmetric, non-symmetric, or hierarchical designs. The artificial stones did not reproduce the exact shapes of surrounding stones, but broke up the flat membrane's square shape and added contrast from external lighting to avoid detection or recognition. FIG. 9D demonstrates the dramatic changes in Gaussian curvature from the deflated to inflated state; the large variety of negative and positive Gaussian curvature surfaces were characteristic of natural stone.

In addition to the rounded stones, a membrane was programmed to mimic the high aspect ratio shape of the *Graptoveria amethorum* plant (FIG. 9B), a succulent with leaves arranged in a spiral. To maintain the high aspect ratio deformation in the non-symmetric leaves, suspended mesh supports were applied to prevent circumferential expansion and direct inflation out of plane. The 3D leaf shapes were split into multiple 2D cross-sections and the silicone length fraction was programmed across each cross-section to achieve the 3D shape control (FIG. 9C). Despite the larger and smaller leaves having been pressurized by the same air source, each leaf inflated to its target shape because the CCOARSE mesh pattern restricted the local radial strain in each silicone segment to the same programmed $\varepsilon_{silicone}$. FIG. 9D shows that the Gaussian curvature of the inflated *Graptoveria amethorum* membrane had a regular arrangement of high curvature surfaces.

CCOARSE was used to control the shape of a 3D electroluminescent display embedded on a topographical map (FIG. 9E). Black contour lines and shaded regions of equal elevation represent the 3D landscape on the 2D map. Inflating the map revealed the landscape's true 3D shape. CCOARSE was used to control the 3D topography and integrated a stretchable electroluminescent display in high-elevation regions for illumination.

In another embodiment, the membrane comprises a material which can be selectively cross-linked. In this way, the mesh is a part of the membrane material itself. For example, a membrane material may be selected wherein a change in photo exposure or length of starting polymers can be used to control the mechanical properties (e.g., strain and stiffness) of the membrane layer. Such as, for example, the materials disclosed in International Application No. PCT/US17/44923, "Polymer Compositions for 3D Printing and 3D Printers," the disclosure of which is incorporated herein by this reference. In this way, the membrane can be patterned (for example, exposed with a mask, 3D printer, etc.) to produce varying degrees and/or types of cross-linking so as to pattern regions of the membrane layer that will strain under pressure more than other regions of the membrane layer. In an exemplary embodiment, the size or degree of branching in the polymer may be changed by controlling a mixing ratio of polymer reactants, which can be done for silicones, polyurethanes, or other elastomers. In this example, one mixture may be used for high stiffness, low strain regions, while another mixture may be used for low-stiffness, high strain regions. The material can be designed to allow these such differing regions to also cross-link to each other, thereby creating a strong bond between regions. In another exemplary embodiment, a material is selected such that a longer local curing time results in a more stiff (or, in other embodiments, less stiff polymer), such that the stiffness may vary across the material according to the curing time. In an example using a material which is cured using exposure to light, the light may be patterned, for example, using a laser, a projector, etc. In another example, the material may be cured thermally and the thermal exposure may be patterned. In another example, solid particles (e.g., fibers, rods, nanoparticles, etc.) may be mixed with the uncured membrane material. Such a mixture may be designed such that the use of stimulus (e.g., laser, ultraviolet light, thermal stimulus, etc.) will cause the particles to bind with the membrane material (e.g., polymer matrix, etc.), making stimulus-exposed regions stiff, while in other regions the polymer may cross-link but does not bind to the solid particles without significantly changing the material stiffness.

It has been shown that CCOARSE is a simple and scalable process for the prescriptive patterning of 2D surfaces that pneumatically actuate into complex 3D shapes. By characterizing the anisotropic stretching of silicone-mesh composites, curve fitting could be used to program the shape change of these membranes, solving a long standing design and control challenge. Exemplary embodiments of the presently-disclosed concentric mesh designs and hierarchical membrane structures enabled textural camouflage in a river stone environment. Although demonstrated here with pneumatically actuated elastomers, CCOARSE can be implemented with any pair of materials that have different stretching responses (e.g., swelling hydrogels, dielectric elastomer actuators, etc.). Improvements in the maximum attainable strain or in the mesh patterning resolution would allow for higher aspect ratio shape transformations. Additionally, accounting for circumferential and radial stress variations in hierarchal features would improve the accuracy of hierarchical shape reproduction.

The technological implications for this work are extensive and include the sophisticated control of soft material shapes for intelligent catheters, improved aerodynamic efficiency in airplane wings, wearable clothing, soft robotic design, reconfigurable surfaces for 3D displays and vanishing human-machine interfaces, and new scientific methods for testing the efficacy of textural designs in natural camouflage.

In an aspect of the present disclosure, the present disclosure may be embodied as a method for creating a restriction pattern from a mask material having a strain ($\varepsilon_{mask}$) for mapping an elastomeric membrane having a strain ($\varepsilon_{membrane}$) into a target 3D shape. The method comprises discretizing the target 3D shape into a plurality of radial segments. A radial strain ($\varepsilon_r$) is determined for each radial position (r) on each radial segment of the plurality of radial segments. A restriction pattern is determined, wherein the restriction pattern comprises a quantity of mask material for each position r to provide a composite strain ($\varepsilon_{mask}$, $\varepsilon_{silicone}$). In some embodiments, the method further comprises depositing a first membrane layer into a mold and placing mask material into the first membrane layer according to the determined restriction pattern. The first membrane layer is cured.

In some embodiments, the mask material comprises a plurality of fibers, and the mask materials are placed by depositing the plurality of fibers onto the first membrane layer. The restriction pattern may be formed by, for example, laser cutting the fibers. In some embodiments, the mask material is a stiffened region of the first membrane layer. For example, the mask material may be a cross-linked region of the first membrane layer. Such a cross-linked region may be formed by treating the first membrane layer, for example, by photo exposure, in order to locally cross-link the first membrane layer material.

In some embodiments, a second membrane layer may be deposited on the first membrane layer. In some embodiments, a second layer of mask material may be placed. Such a second layer of mask material may be placed in the first membrane layer. In other embodiments, the second layer of mask material may be placed in a second membrane layer.

In some embodiments, the membrane comprises an electroluminescent material. For example, the membrane may comprise an electroluminescent layer.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

EXPERIMENTAL EMBODIMENTS

Figure 11:
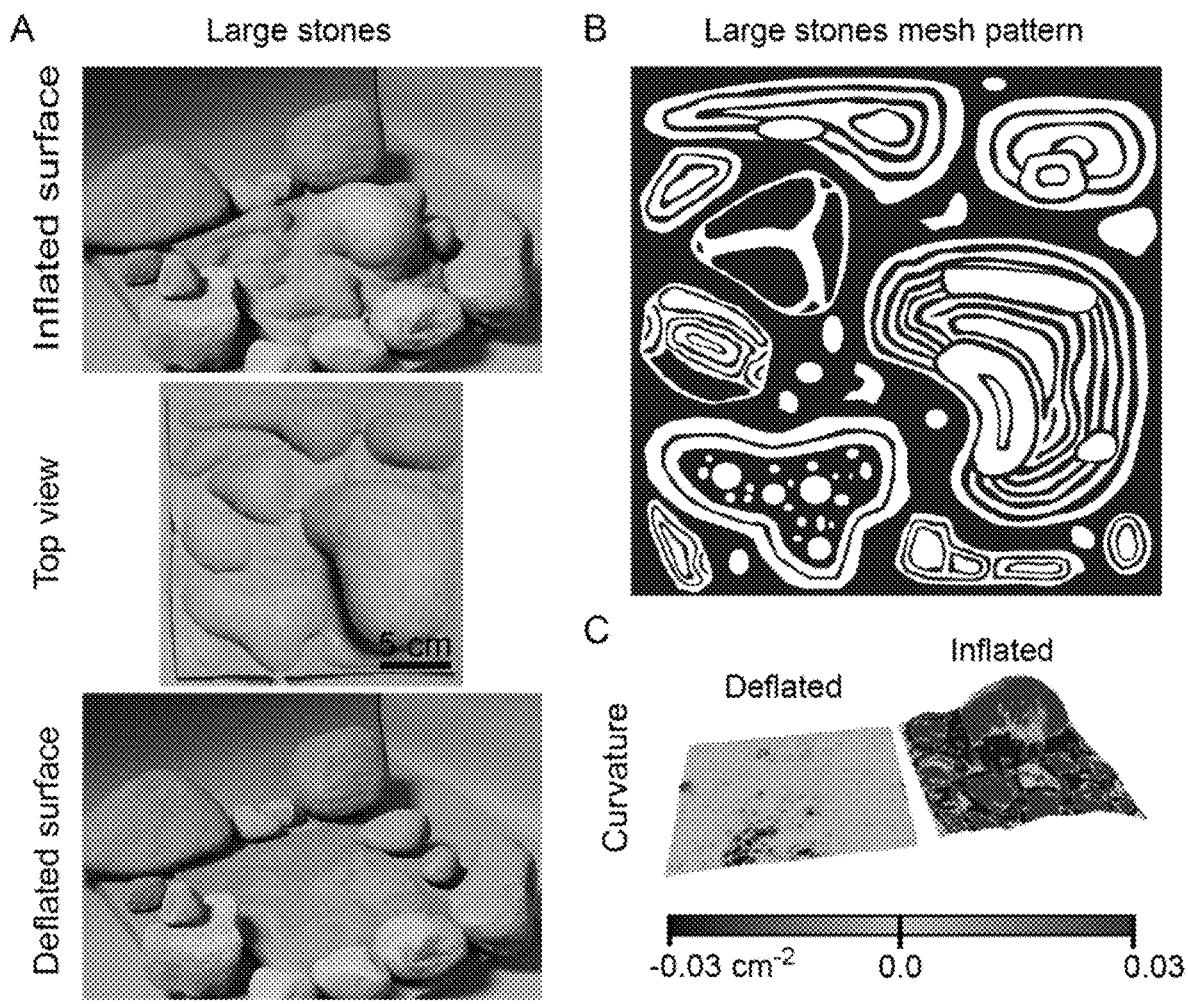
FIG. 11. A 22- by 22-cm membrane programmed to inflate into non-symmetric and hierarchical large stone shapes. (A) Inflated and deflated shapes of the membrane. Natural river stones with the same color encircle the membrane. (B) The mesh design used to control the shape of the artificial stones in (A). (C) The Gaussian curvatures of the inflated and deflated shapes.

The present disclosure is further illustrated by the following experimental embodiments which are not intended to limit the scope of this disclosure. The fabrication process for all experimental mesh embedded elastomer surfaces followed the same initial procedure (FIG. 2). Silicone (Ecoflex 00-30; Smooth-On, Inc.) was poured into a 3D printed mold to set the membrane shape and thickness. Circular membranes (FIGS. 1 and 2) were 2 mm thick with 75 mm diameters. Circular membrane molds were 3D printed using an Objet30 printer (Stratasys Ltd) and baked at 80° C. for 6 hours before using. Larger membrane (FIGS. 9 and 11) molds were made from ⅛ inch laser cut acrylic sheets, that defined the mold geometry, glued to ¼ inch acrylic sheets. Immediately after pouring silicone into the mold, a single layer of nonwoven mesh (Sulky Soft'n Sheer Stabilizer) was placed on the uncured silicone until the silicone wet the entire mesh area. A second mesh layer was then added. Once both mesh layers were wet, the mold was placed in the laser cutter (Zing 24) and the mesh pattern was cut using 100% speed, 15% power, and 500 Hz frequency. The cut mesh was removed with tweezers according to the programmed pattern and the membrane was set out at room temperature until the silicone cured, ≈1 hour. After curing, an additional layer of fresh silicone was poured onto the membrane and leveled to fill any gaps in the silicone generated during mesh removal. The finished membranes were cured at room temperature for 6 hours.

The horizontal mesh supports used in FIG. 8C and the *Graptoveria amethorum* membrane were glued (Sil-Poxy; Smooth-On, Inc.) to the back side of fully cured membranes. The mesh supports were made from the same nonwoven mesh used to pattern the membranes and were cut to shape using the Zing 24 laser cutter. Before cutting, the mesh supports were wet with 2-Propanol to increase the laser cutter resolution. After drying, the mesh support edges were glued to the membranes to constrain the membrane displacement and allow for airflow through the mesh support center. The glue was placed using a 5 ml syringe and 1 mm diameter tip. Smaller mesh supports were glued first, followed by larger supports assembled on top of the smaller supports (FIG. 8C).

For all mesh patterns, a continuous mesh was patterned, $L_s=0$, across radial segments in the mesh designs where the mesh length fractions were below the laser cutter resolution, $L_s<L^*_s$.

Figure 13:
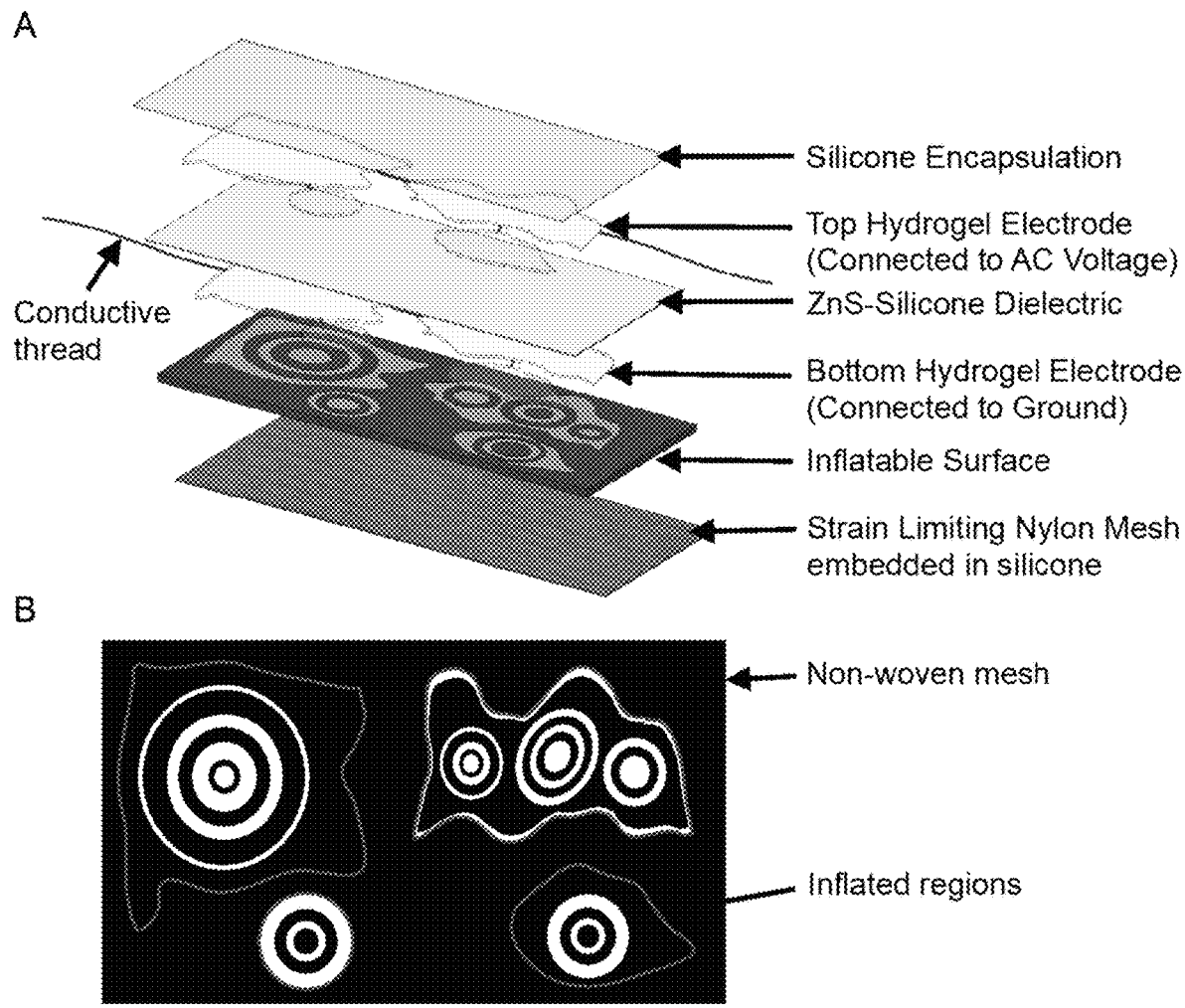
FIG. 13. (A) Exploded view of the 3D electroluminescent display. (B) The mesh design used to control the inflated shape of (A).

FIG. 13A shows an exploded view of an exemplary 3D electroluminescent (EL) display, which was a multi-layer structure with EL display components integrated on the top of an inflatable surface. CCOARSE mesh patterns defined the inflated shape geometry (FIG. 13B). The light emitting dielectric layer was silicone elastomer (Ecoflex 00-30; Smooth-On Inc.) embedded with ZnS:Cu based green EL phosphors (D512; Shanghai KPT, Inc.). The ZnS:silicone layer was mixed at a 1:2 ratio by weight and cast in a 3D printed mold into a 0.3 mm sheet (Objet30; Stratasys Ltd). The electrodes are transparent and ionically conductive hydrogels cut to the shape of the 2D landscapes. The aqueous hydrogel was prepared and UV cross-linked for two minutes into the shapes shown in FIG. 13A. The electrodes shapes were interconnected with conductive threads (Adafruit Industries) and defined the light-emitting portion of the map. The EL display structure was bonded with the inflatable surface and encapsulated with an additional layer of silicone. The EL display was powered with an AC voltage input of 1.3 kV at 400 Hz. The colorations on top of the topographical map were painted with a mixture of silicone and silicone pigments (Silc Pig; Smooth-On Inc.).

Circular membranes were inflated in custom acrylic clamps attached to a pressurized air source. The stone,

*Graptoveria amethorum*, and display membranes were glued (Sil-Poxy; Smooth-On, Inc.) to 1/16 inch mesh embedded silicone bases, with no glue placed directly under the inflated membranes. The *Graptoveria amethorum* membrane was additionally glued to a 1/8 inch acrylic plate to keep the base flat during inflation.

Tensile tests were performed according to ASTM D412 on a Zwick Roell z010 instrument using a pneumatic clamp, with the exception that the samples were 1 mm thick to match the membrane thickness instead of the recommended 3 mm. All tests were conducted using a 10 kN load cell and a strain rate of 5 min$^{-1}$.

2D membrane displacements were measured from digital camera images (Canon EOS Rebel T3) of the inflated membrane profile.

A SCANIFY 3D scanner measured the 3D shape of inflated samples and converted the data to digital surface mesh files. Rhino 3D modeling software calculated the Gaussian curvature from the surface mesh files.

Design Considerations

Description for an axisymmetric shape: A simple 2D cross-section of the target shape on the r-z plane was sufficient to reproduce the 3D shape due to the symmetry. The external surface of the target shape was first traced using a program in Matlab, which split the shape into radial segments of length L. The program then calculated the effective slope of the target shape between segments and used Eq. 3 to calculate the radial strain required to achieve that slope. The program then used the correlation from FIG. 6, y=0.77x$^2$+0.23x, to calculate the silicone length fraction required to achieve the target strain. This information was then used to draw the fabric pattern in a CAD software and laser-cut the pattern into the fabric.

Choosing the silicone strain, $\varepsilon_{silicone}$: When calculating the silicone length fraction using, for example, FIG. 6, the desired silicone strain is used, $\varepsilon_{silicone}$. This strain is bound on the lower end by the minimum strain required to achieve the target shape (maximum of the result from Eq. 3) and on the high end by the failure strain of the material. If the minimum strain is selected, then the radial segment with the largest slope will be entirely made of silicone, $L_s/L=1$. An intermediate strain that was below the material limit, but allowed a mesh strip wider than the laser-cutter resolution to be programmed into the segment with the largest strain was typically selected.

For membranes with multiple papilla: It may be advantageous to use the same $\varepsilon_{silicone}$ so that all membranes reach their target shape when actuated with the same pressure source.

Figure 12:
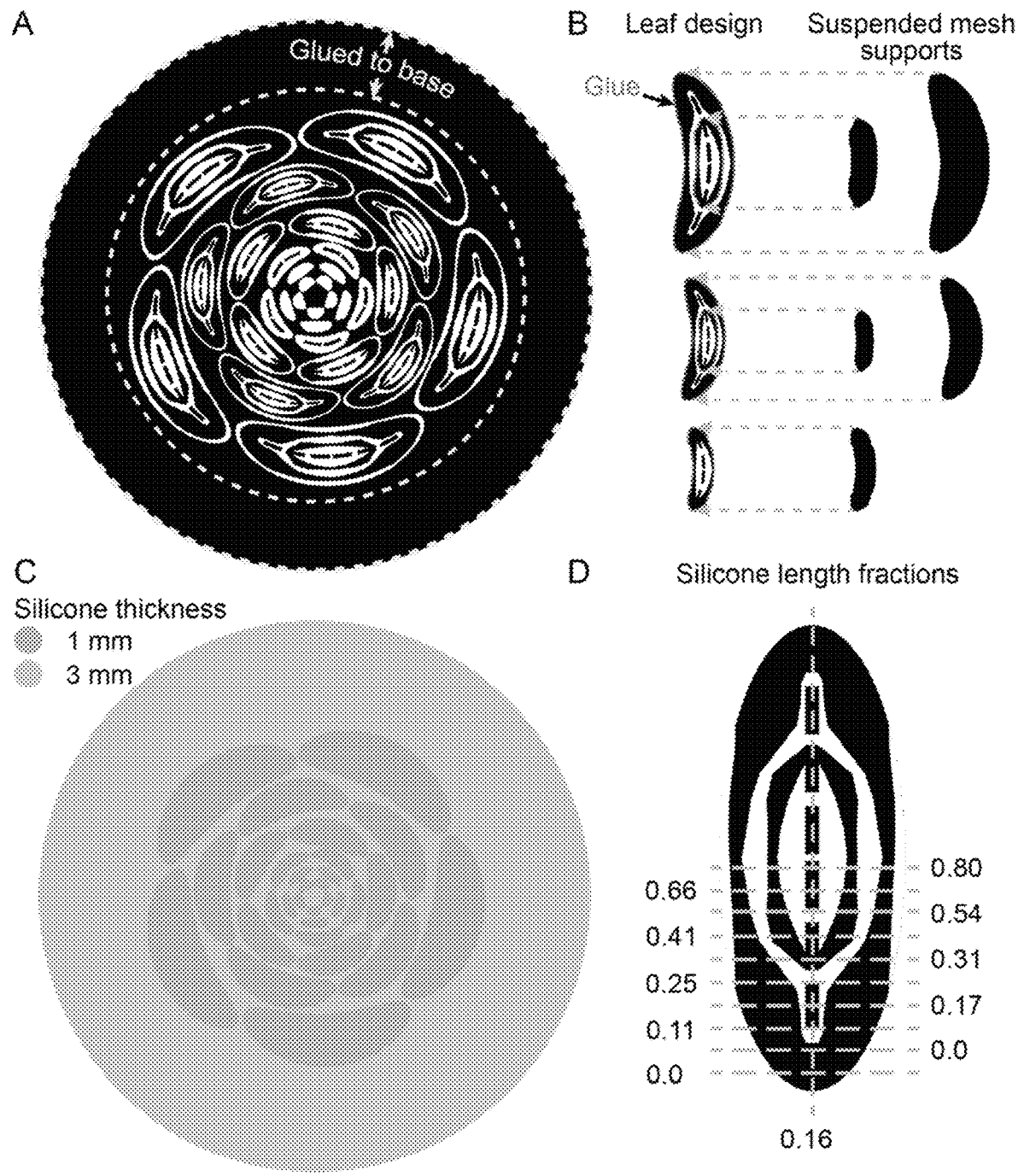
FIG. 12. (A) Mesh pattern for the artificial *Graptoveria amethorum* membrane. The outer ring (dashed lines) is glued to a silicone bottom layer, which is attached to an acrylic plate. (B) The suspended mesh supports used to maintain the high aspect ratio shapes of the mesh patterns. The supports are glued to the membrane around the edges of the underlying mesh design. (C) The silicone under the leaves is 1 mm thick, compared to 3 mm thick everywhere else, to increase the displacement of the leaves (dark gray) relative to the displacement of the entire plant membrane (inside the dashed lines in (A)). (D) The mesh pattern design for the large *Graptoveria amethorum* leaves. The silicone length fractions are programmed across each dashed line.

For non-axisymmetric shapes: Non-axisymmetric shapes were programmed by slicing the shape into multiple 2D planes and programming the silicon length fractions on each plane. FIG. 12D shows the cross-sections used to program the *Graptoveria amethorum* plant. The fabric patterns were then smoothly connected between cross-sections.

Scalability Analysis

The scalability of this system is bookended by: (i) the inflation time for large systems, and (ii) the minimum patterning resolution for small systems.

Inflation time consideration: The flow rate of a fluid through a tube is related to the tube diameter, D, by D$^2$. The volume that needs to be filled to actuate a silicone membrane, L$^2$D, depends on the membrane area, L$^2$, and the depth of the air chamber, which is limited by D. The fill volume normalized by the flow rate is L$^2$D$^{-1}$. This ratio increases as the membrane size increases and shows that the inflation of large membranes takes longer. Empirically, balloons on the order of meters in length scale are routinely produced at large quantities and it takes about 90 minutes to inflate a 300 m$^3$ Macy's parade balloon from a 5 cm diameter hose. A 0.5 m hose could therefore inflate a 600 m$^2$ membrane in approximately 1 minute.

Figure 8:
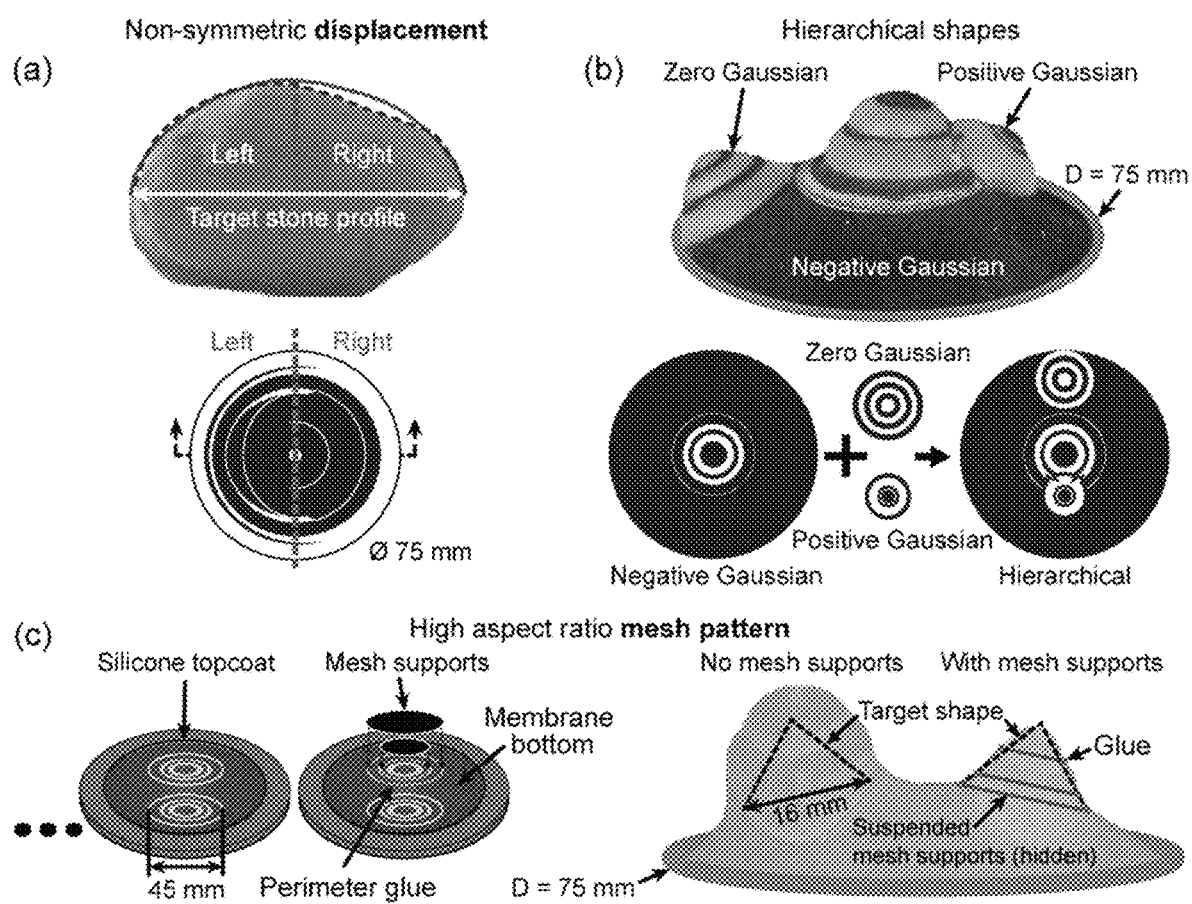
FIG. 8. Design and displacement of membranes with non-symmetric and hierarchical target shapes. (A) A membrane with non-symmetric target displacement (solid line) designed after a river stone silhouette (dashed line). (B) An inflated membrane with $2^{nd}$ order hierarchy that combines negative, zero, and positive Gaussian curvature surfaces. (C) Adding suspended mesh supports to the membrane underside improves the shape fidelity of high aspect ratio mesh patterns by preventing bending of the individual mesh strips. The inflated membrane has two elliptical membranes with 16 mm initial width across the minor axis. The right membrane has suspended mesh supports.

To miniaturize the structures demonstrated in FIG. 8, it was approximated how much larger the membrane radius can be compared to the minimum patterning resolution of the mesh, or other high modulus material that provides the same mechanical function. In FIG. 8 the membrane was divided into 10 radial segments. If each segment has access to 10 different strain outputs, then each segment must be 10× the width of the minimum resolution. It may be assumed that the minimum patterning resolution for a high stiffness material is practically limited by a research grade h-line mask aligner with ≈1 ym resolution. A reasonable size limit is therefore 100× the resolution limit, or a membrane with ≈100 μm radius, which is near the size limit for human vision.

Further Discussion

As described above, in some embodiments, two materials were used—a nonwoven fiber mesh (Sulky Soft'n Sheer Stabilizer) and a silicone elastomer (Ecoflex 00-10; Smooth-On, Inc.)—to act as synthetic tissue groupings. A simple silicone skin can be pneumatically actuated into a balloon shape with radial and circumferential deformations. When a fiber mesh is patterned into, for example, concentric rings, the fiber, which has a much higher Young's modulus (E~7.7 MPa), will constrict the stretch of the silicone membrane in a circumferential direction, keeping the stretch only in radial direction.

The CCOARSE mechanism monitors the membrane expansion by one-to-one mapping from radial stretch of the elastomer to target 3D shape displacement. As shown in FIGS. 1 and 2, the cylindrical coordinate (r,z) is defined as a point on the undeformed axisymmetic membrane and (ρ,η) is defined as a point on the deformed membrane. Mathematically, for the circumferential strain, $\varepsilon_c$, $$\varepsilon_c = 0 \tag{4}$$

as ρ=r is assumed due to the insertion of fiber.

As described above, radial strain, $\varepsilon_r$, can be calculated using $$\varepsilon_r = \left(1 + \frac{d\eta^2}{dr}\right)^{\frac{1}{2}} - 1 \text{ where } \frac{d\eta}{dr} \tag{5}$$

is the slope of the membrane in the radial direction. Equation 5 allows the radial strain to be related directly to the slope.

Flat Membrane Method

Methodology and Result

Fabrication Method

Using Eq. 2, the edge of an axisymmetric shape can be traced and inflated skin can be reversely mapped to undeformed membrane. With MATLAB, the locations and thicknesses of the concentric fiber rings can be calculated and output. In an exemplary method of fabrication described above, silicone was first poured into a flat circular membrane mold to define shape and thickness. Fabric was then layered over the uncured silicone, and the fabric was cut with a laser cutter, which utilized the graphical output of the MATLAB file. Finally, the unnecessary fabric pieces were removed and another layer of silicone was poured to secure the fabric.

2D Implementation

After successful replication of the 1D axisymmetric flat membranes in three classic conformations, positive, zero, and negative Gaussian, 2D asymmetrical shapes were defined with the same principle. However, due to the actuation of membrane in a diaphragm configuration, we chose to model only half of a rock. In some embodiments, an object (such as a rock) can be modelled by modelling the top and bottom of the object individually, fabricating two membranes, adhering the outer rings together, and pneumatically actuating the membrane complex like inflating a balloon.

Figure 14:
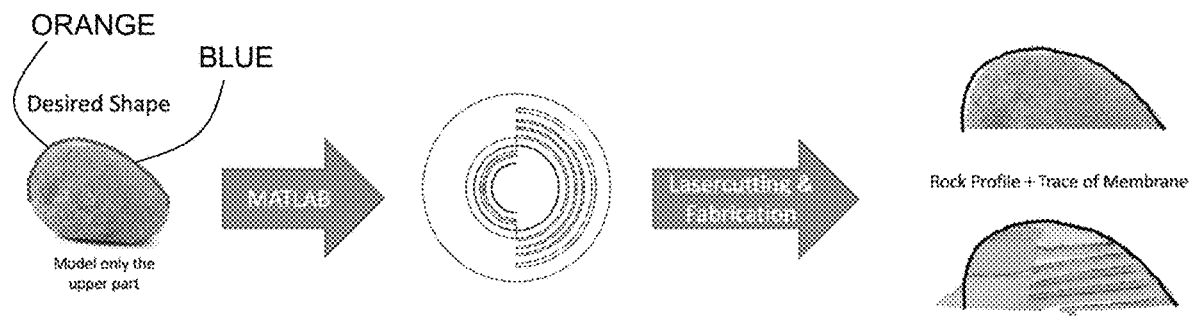
FIG. 14 depicts an exemplary fabrication process for a 2D flat membrane and the result.

For modeling, we identified the highest point of the rock, and divided the rock into two parts. FIG. 14 shows two different lines (orange for left and blue for right) tracing the profile of the rock and the resulting integrated laser-cutting graph. The black line in FIG. 14 is the profile of the inflated membrane. When the profile was projected onto the rock, we could conclude that the match between the rock profile and the membrane tracing was relatively close.

Hierarchical Shapes

Figure 15A:
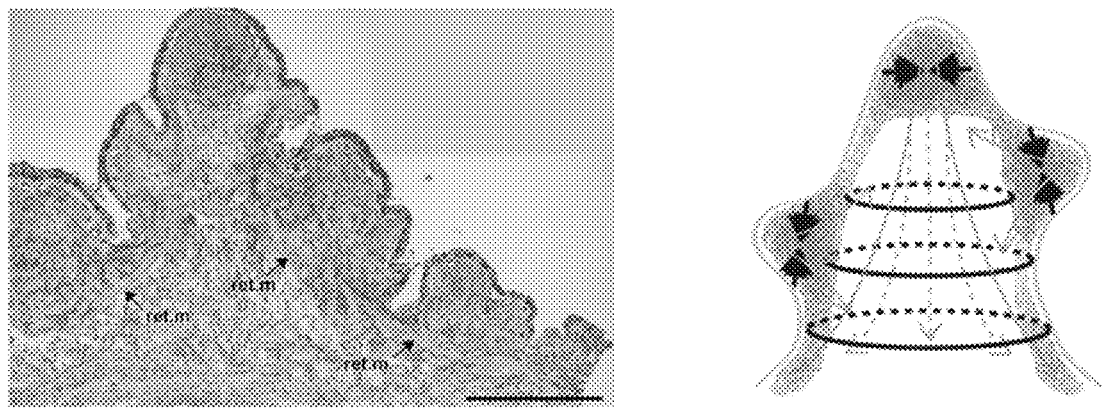
FIG. 15A shows the hierarchical shapes on an Octopus Papilla.
Figure 15B:
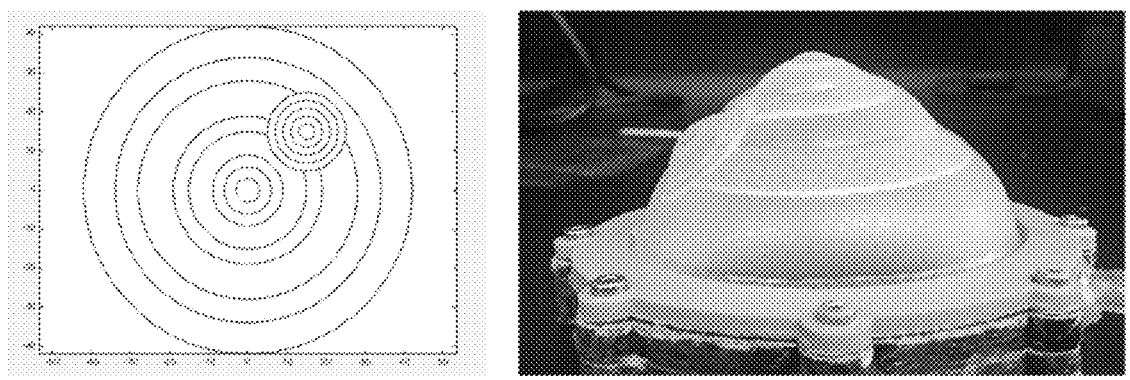
FIG. 15B shows an exemplary hierarchical flat membrane according to an embodiment of the present disclosure.

Octopus' papillae has a hierarchical characteristic. Shown in FIG. 15A is a cross section view of an octopus's eye papillae. The hierarchical shapes add additional dimensionality to papillae and resemble a more organic profile closer to natural objects such as coral reefs. Similarly, in some embodiments of the present disclosure, concentric circles can be added at specific locations of the 1D axisymmetric membrane. An exemplary resulting inflated membrane is shown in FIG. 15B. By placing simple 1D axisymmetric circles of different sizes at various locations, we could make stretchable membrane with complex geometry.

Folded Membrane Method

Methodology

Figure 16:
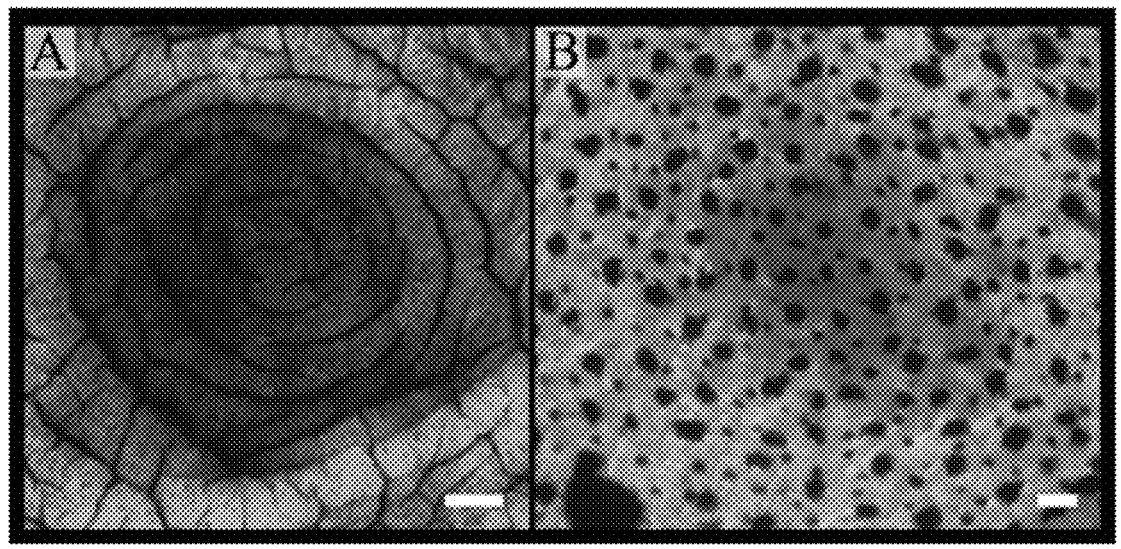
FIG. 16 membrane folds of an octopus.
Figure 17:
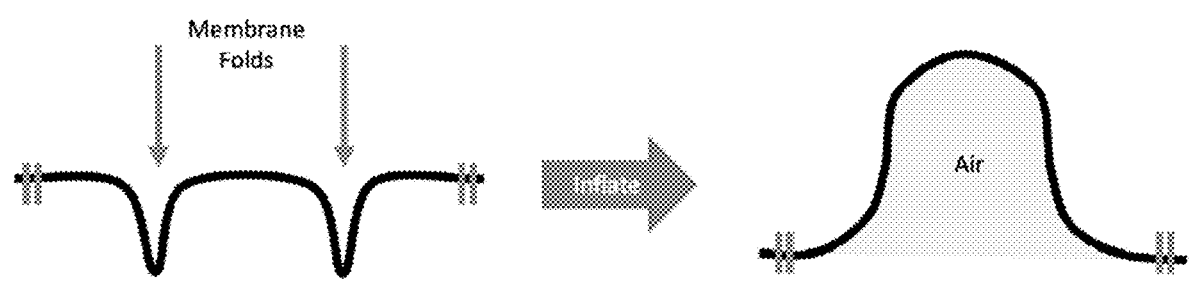
FIG. 17 is a diagram showing a cross-section of a folded membrane design.

Some embodiments of the flat membrane method described above were only able to achieve a relatively low aspect ratio of 0.8-1.3, which is not close to that of cephalopod's papillae extension of approximately 3.8-7.0. When cephalopods extend their papillae, the papillae pushes outward on the skin layer, which has overlying connective tissue and epidermis. There are also membrane folds embedded in the skin, as shown in FIG. 16, to ensure that the epidermis does not tear and allow an increase in surface area for during papillae extension. In another embodiment of the present disclosure a membrane with one or more folds is provided. The fold(s) allow for a greater degree of extension; FIG. 17 shows a cross-section of a design with one fold (exemplary concentric fold appears as two folds in cross-section).

Experimental Details

Figure 18A:
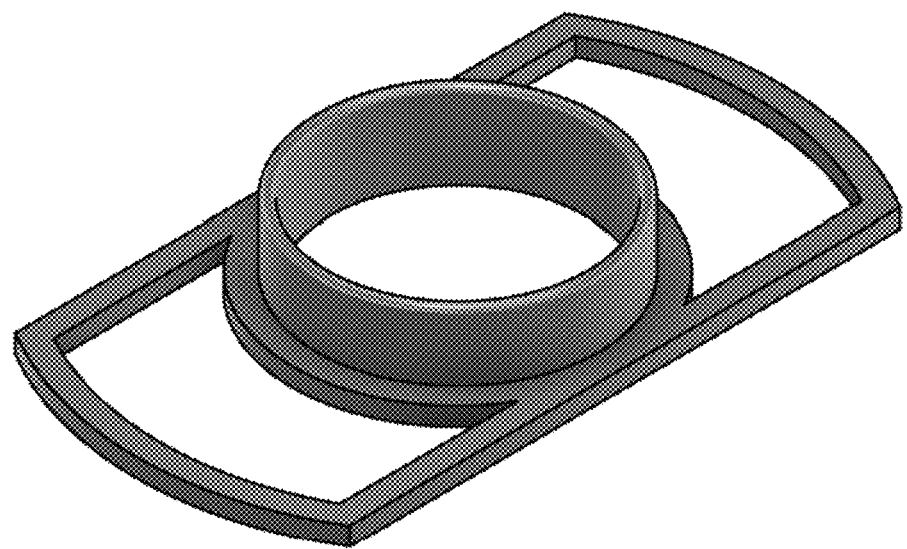
FIG. 18A is a perspective view of an exemplary top mold.
Figure 18B:
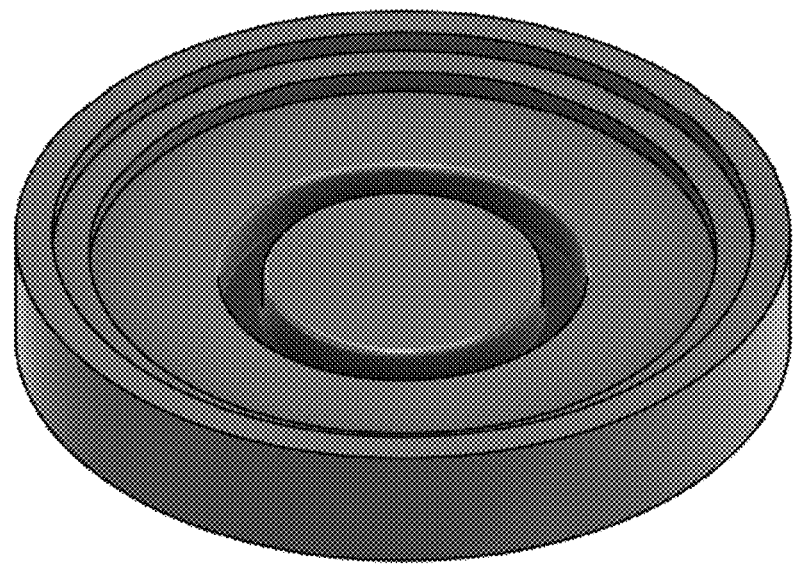
FIG. 18B is a perspective view of an exemplary bottom mold.

FIGS. 18A and 18B show CAD models for a top mold (FIG. 18A) and a bottom mold (FIG. 18B) suitable for fabricating a membrane with one fold. For the fabrication process, silicone was poured into the bottom mold first. Then pre-cut fabric mesh was placed within the uncured silicone. The top mold was placed on the uncured silicone, and aligned with the bottom mold.

Experimental membranes having one and three folds were tested. All folds were evenly spaced for the simplicity of the testing. Fabric mesh was placed at various locations to demonstrate its control over the general shape.

Results

Number of Folds

Figure 19A:
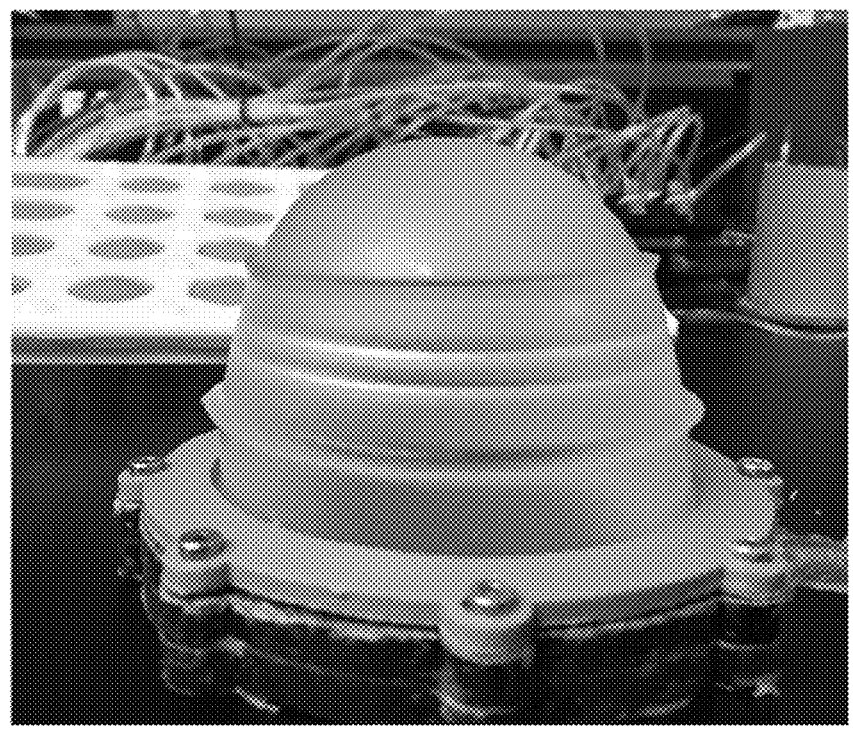
FIG. 19A shows an exemplary inflated membrane having one fold and no fabric (pressure ~1-3 psi).
Figure 19B:
FIG. 19B shows an exemplary inflated membrane having one fold wherein the bottom layer includes fabric (pressure ~1-3 psi).
Figure 20A:
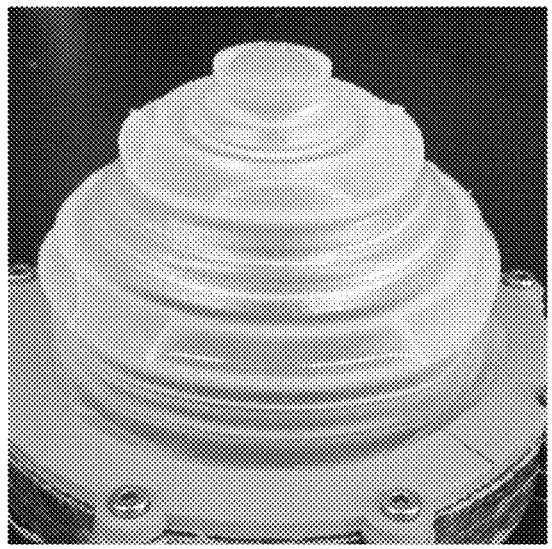
FIG. 20A shows an exemplary inflated membrane having three folds and no fabric (pressure ~1-3 psi).
Figure 20B:
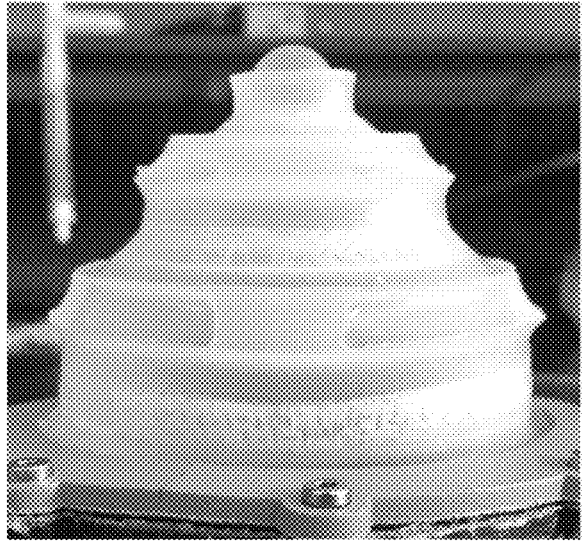
FIG. 20B shows an exemplary inflated membrane having three folds wherein the bottom layer includes fabric (three rings) (pressure ~1-3 psi).
Figure 20C:
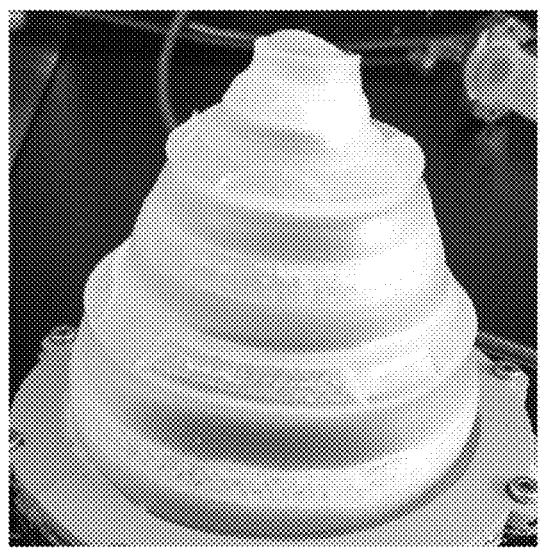
FIG. 20C shows an exemplary inflated membrane having three folds wherein the bottom layer includes fabric (six rings) (pressure ~1-3 psi).
Figure 21A:
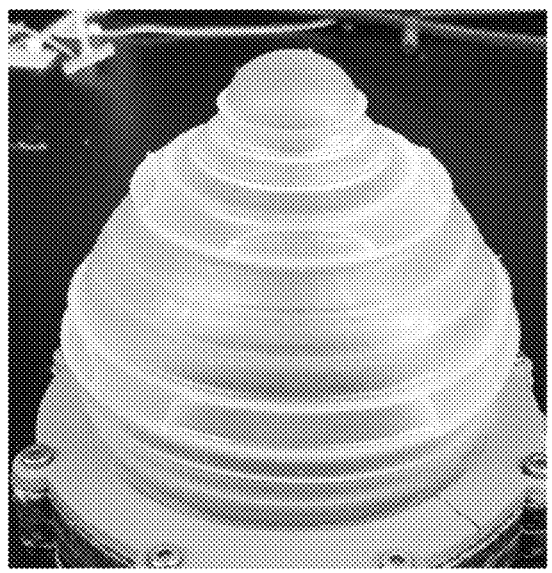
FIG. 21A shows an exemplary over-inflated membrane having three folds and no fabric (pressure >3 psi).
Figure 21B:
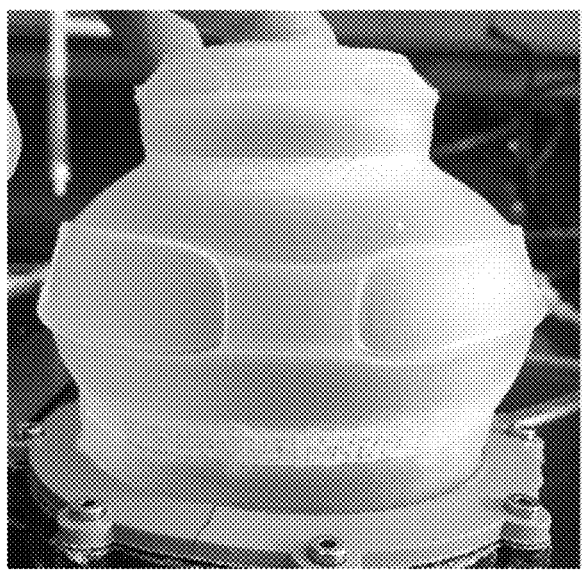
FIG. 21B shows an exemplary over-inflated membrane having three folds wherein the bottom layer includes fabric (three rings) (pressure >3 psi).
Figure 21C:
FIG. 21C shows an exemplary over-inflated membrane having three folds wherein the bottom layer includes fabric (six rings) (pressure >3 psi).

From FIGS. 19-21, increasing the number of folds added the complexity of the shape by giving it a multi-layered effect. In addition, because of the increase in surface area nested in the folds, the aspect ratio of the membrane was increased. For example, the exemplary one-fold membrane without fabric had an aspect ratio of 2.5 while that of the three-fold membrane was 3.1. It was evident that the folded membrane method had increased the aspect ratio by 2-3 times.

Placement of Fabric

For membranes without fabric (FIGS. 19A, 20A, and 21A) the overall shapes were close to a dome. When fabric mesh was added to the membranes, it exerted control on the membrane. FIG. 21B shows a that when the membrane was over-inflated with a pressurized air greater than 3 psi, with the use of fabric, we could make a shape with negative slopes, which was not possible to achieve in the flat membrane method.

Hierarchical Shapes

Figure 22A:
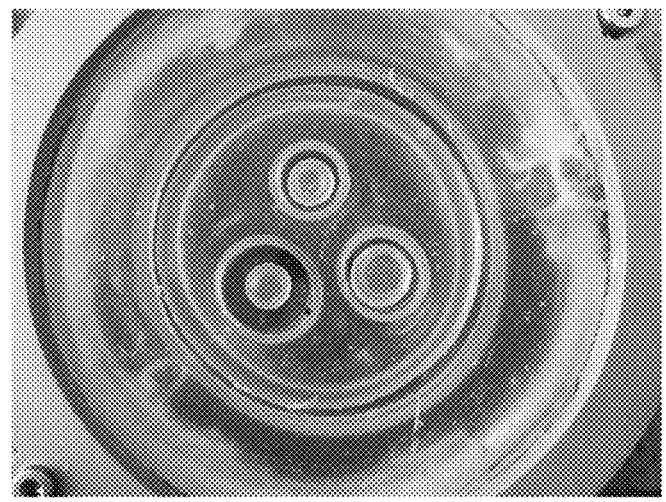
FIG. 22A shows an exemplary hierarchical folded membrane (deflated).
Figure 22B:
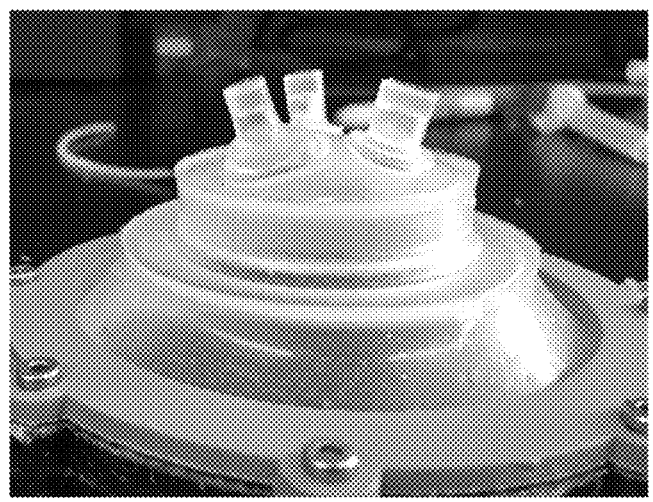
FIG. 22B shows an exemplary hierarchical folded membrane (partially inflated).
Figure 22C:
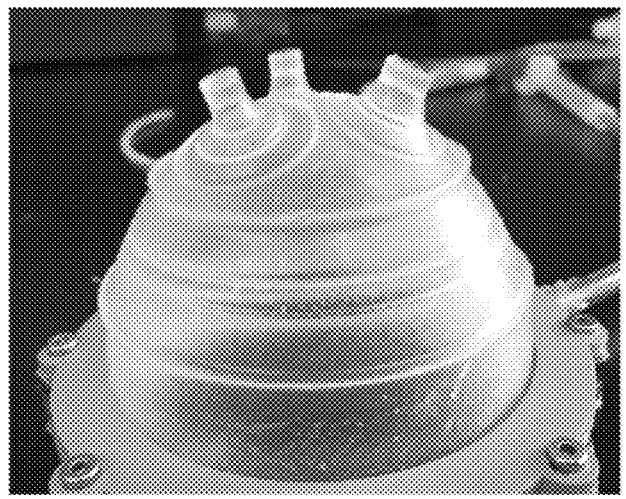
FIG. 22C shows an exemplary hierarchical folded membrane (fully inflated).

Similar to the hierarchy integration of the flat membrane, embodiments of folded membranes were created with folded membranes of a smaller scale added to the exiting one-fold design. As shown in FIGS. 22A-22C, at different levels of inflation, the changes in shapes were very substantial. For example, the partially inflated membrane had a resemblance of a birthday day cake with the two bottom layers as cakes and the three knobs as candles.

Although the present disclosure has been described with respect to one or more particular embodiments, it will be understood that other embodiments of the present disclosure may be made without departing from the spirit and scope of the present disclosure.

What is claimed is:

1. A method for creating a mesh pattern from a mesh material having a strain ($\varepsilon_{mask}$) for mapping an elastomeric membrane having a strain ($\varepsilon_{membrane}$) into a target 3D shape, comprising:
    discretizing the target 3D shape into a plurality of radial segments;
    determining a radial strain ($\varepsilon_r$) for each radial position (r) on each radial segment of the plurality of radial segments; and
    determining a mesh pattern comprising a quantity of mesh material for each position r to provide a composite strain ($\varepsilon_{mask}$, $\varepsilon_{silicone}$).

2. The method of claim 1, further comprising:
    depositing a first membrane layer into a mold;
    placing mesh material onto the first membrane layer according to the determined mesh pattern; and
    curing the first membrane layer.

3. The method of claim 2, further comprising depositing a second membrane layer onto the mesh material and first membrane layer.

4. The method of claim 2, wherein placing the mesh material onto the first membrane layer further comprises:
    treating the mesh material according to the mesh pattern; and
    removing excess mesh material to leave the mesh pattern.

5. The method of claim 4, wherein a laser is used to treat the mesh material.

6. The method of claim 2, wherein
    the mesh material placed onto the first membrane layer comprises a plurality of fibers, and wherein the act of placing further comprises embedding the mesh material within the first membrane layer.

7. The method of claim 6, wherein the first membrane layer comprises silicone.

8. The method of claim 6, wherein each fiber of the plurality of fibers is flexible.

9. The method of claim 8, wherein each fiber in the plurality of fibers is substantially inextensible in a longitudinal direction.

10. The method of claim 6, wherein the mesh pattern comprises a plurality of concentric rings.

\* \* \* \* \*